(12) United States Patent
Ohashi

(10) Patent No.: US 10,948,683 B2
(45) Date of Patent: Mar. 16, 2021

(54) IMAGING LENS, CAMERA, AND PORTABLE INFORMATION TERMINAL DEVICE

(71) Applicant: Kazuyasu Ohashi, Chiba (JP)

(72) Inventor: Kazuyasu Ohashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 16/142,230

(22) Filed: Sep. 26, 2018

(65) Prior Publication Data
US 2019/0154946 A1    May 23, 2019

(30) Foreign Application Priority Data

Nov. 22, 2017 (JP) ................................. 2017-225118

(51) Int. Cl.
| | |
|---|---|
| G02B 7/02 | (2006.01) |
| G02B 3/00 | (2006.01) |
| G02B 15/14 | (2006.01) |
| G02B 9/00 | (2006.01) |
| H04N 5/225 | (2006.01) |
| G02B 27/00 | (2006.01) |
| G02B 7/04 | (2021.01) |
| G02B 9/58 | (2006.01) |

(52) U.S. Cl.
CPC ............. *G02B 7/021* (2013.01); *G02B 7/04* (2013.01); *G02B 9/58* (2013.01); *G02B 27/0037* (2013.01); *H04N 5/2254* (2013.01)

(58) Field of Classification Search
CPC .. G02B 13/0015; G02B 13/0045; G02B 7/02; G02B 3/00; G02B 25/001; G02B 15/177; G02B 13/18; G02B 9/10; G02B 13/003; G02B 9/64

USPC ........ 359/811–830, 642–643, 646, 691, 717, 359/736, 793–794, 754
See application file for complete search history.

(56) References Cited

U.S. PATENT DOCUMENTS

| | | | |
|---|---|---|---|
| 2013/0321936 A1 | 12/2013 | Ohashi | |
| 2014/0078605 A1* | 3/2014 | Ohashi | G02B 13/0045 359/754 |
| 2014/0340768 A1 | 11/2014 | Kubota et al. | |
| 2015/0062718 A1 | 3/2015 | Ohashi | |

(Continued)

FOREIGN PATENT DOCUMENTS

| | | |
|---|---|---|
| JP | 59-061814 | 4/1984 |
| JP | 62-138814 | 6/1987 |

(Continued)

*Primary Examiner* — Dawayne Pinkney
(74) *Attorney, Agent, or Firm* — Oblon, McClelland, Maier & Neustadt, L.L.P.

(57) ABSTRACT

An imaging lens includes a front lens group, an aperture stop, and a rear lens group arranged in that order from an object side to an image side. An object-side lens closest to an object within the front lens group and an image-side lens closest to an image within the rear lens group are configured to form only three air lenses therebetween. The air lens is an air gap between an image-side surface of an object-side lens and an object-side surface of an image-side lens. The object-side lens and the image-side lens is adjacent to each other in an optical axis of the imaging lens. The three air lenses include an object-side air lens, an image-side air lens, and an intermediate air lens. The object-side air lens and the image-side air lens is biconvex, and the intermediate air lens is biconcave.

15 Claims, 18 Drawing Sheets

(56) References Cited

U.S. PATENT DOCUMENTS

| | | |
|---|---|---|
| 2015/0116829 A1 | 4/2015 | Ohashi |
| 2015/0212303 A1 | 7/2015 | Ohashi |
| 2015/0260968 A1 | 9/2015 | Ohashi |
| 2016/0054544 A1 | 2/2016 | Ohashi et al. |
| 2016/0077309 A1 | 3/2016 | Ohashi et al. |
| 2017/0235112 A1 | 8/2017 | Ohashi |
| 2018/0196236 A1 | 7/2018 | Ohashi et al. |

FOREIGN PATENT DOCUMENTS

| | | |
|---|---|---|
| JP | 8-313802 | 11/1996 |
| JP | 10-048514 | 2/1998 |
| JP | 11-084229 | 3/1999 |
| JP | 11-326756 | 11/1999 |
| JP | 2005-352060 | 12/2005 |
| JP | 2009-294528 | 12/2009 |
| JP | 2013-250534 | 12/2013 |
| JP | 2014-059466 | 4/2014 |
| JP | 2016-218486 | 12/2016 |

\* cited by examiner

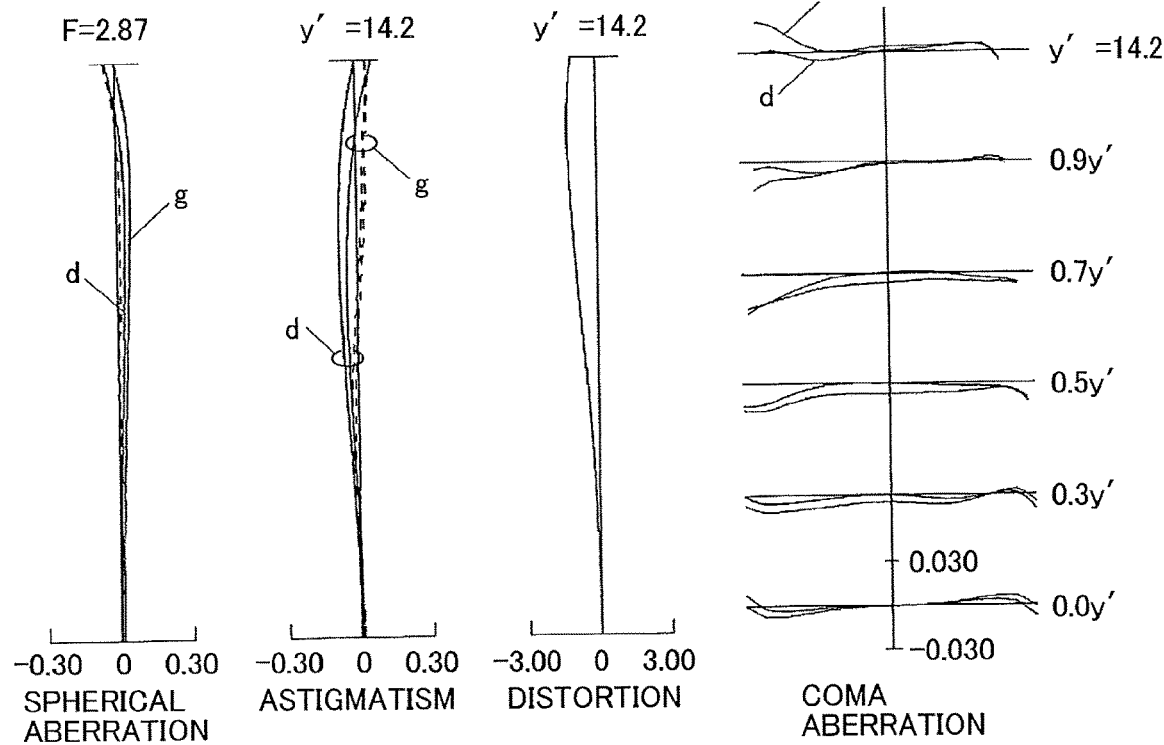
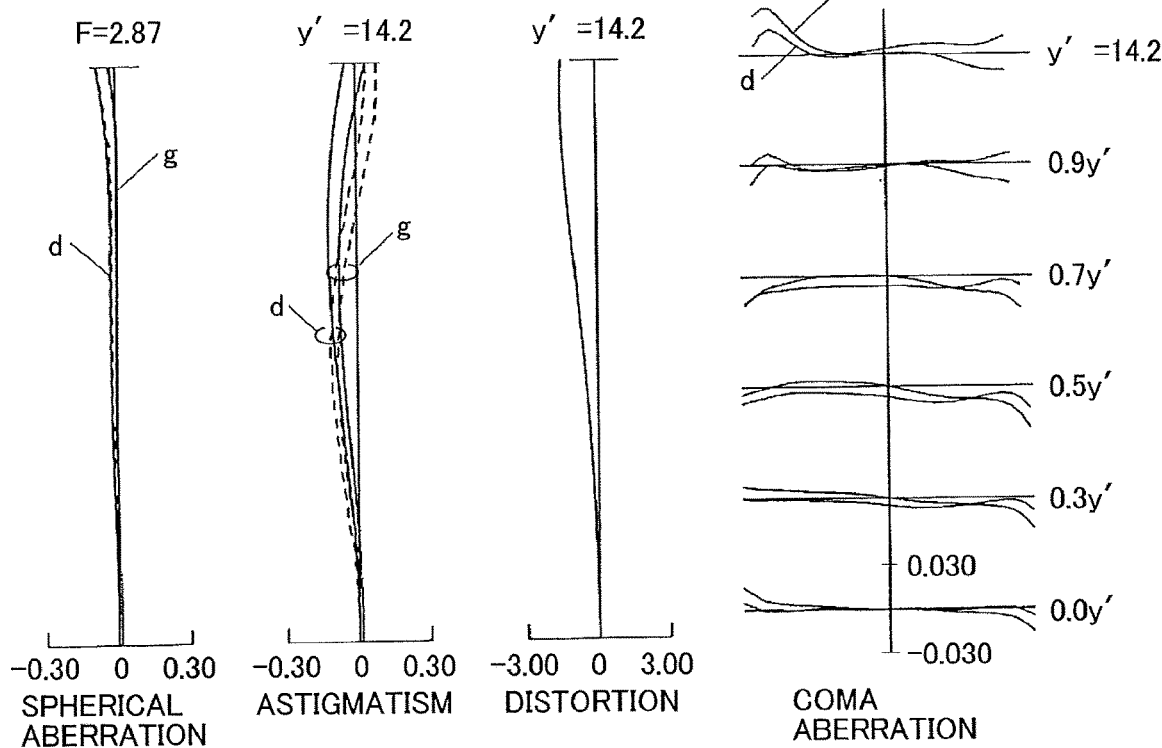

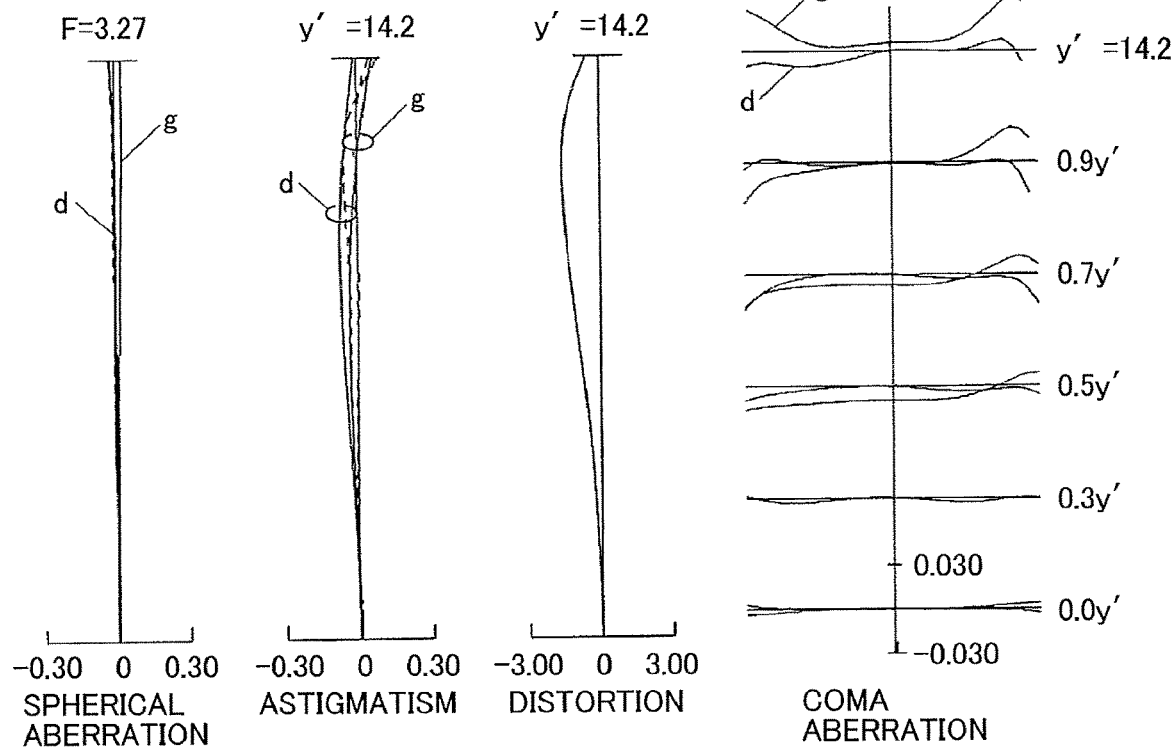
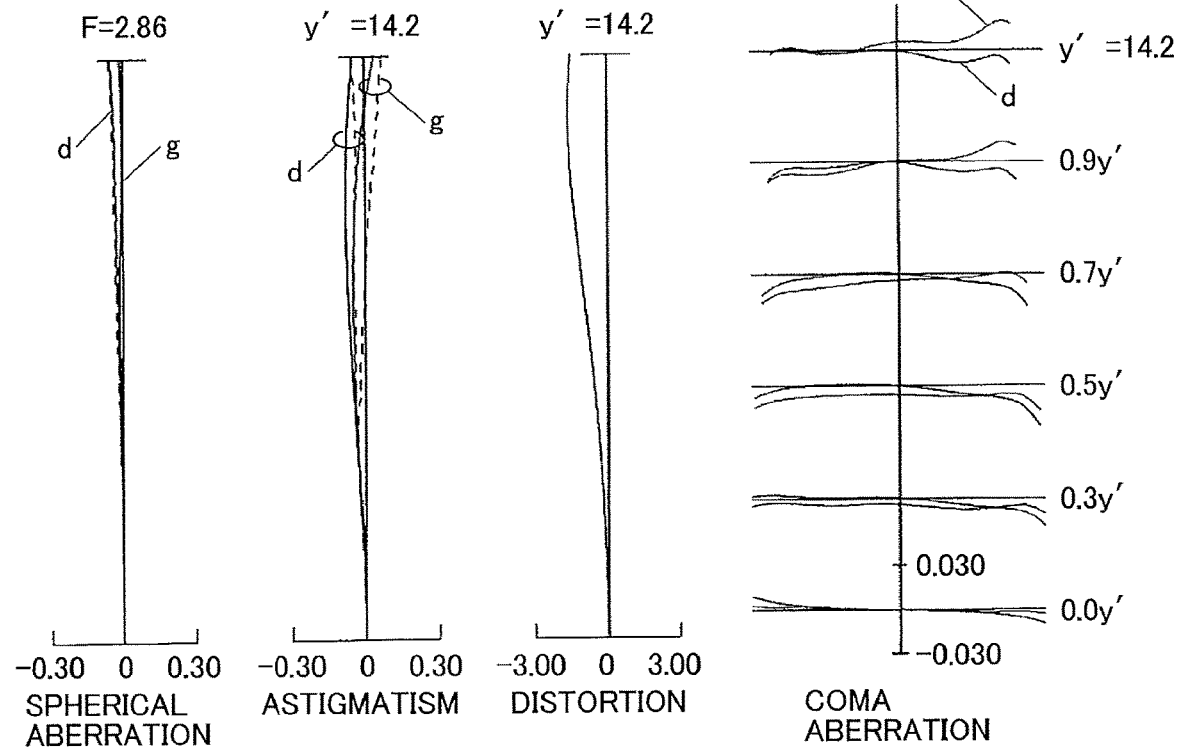

FIG. 19 f = 17.10, F = 2.85, ω = 40.1

| SURFACE NUMBER | R | D | $N_d$ | $\nu_d$ | $P_{gF}$ | GLASS TYPE |
|---|---|---|---|---|---|---|
| 01 | 17.382 | 0.70 | 1.55332 | 71.68 | 0.5402 | HOYA M-FCD500 |
| 02* | 10.950 | 2.46 | | | | |
| 03 | -20.448 | 0.60 | 1.63980 | 34.47 | 0.5922 | OHARA S-TIM27 |
| 04 | 7.591 | 2.64 | 1.88300 | 40.76 | 0.5667 | OHARA S-LAH58 |
| 05 | -28.420 | 0.90 | | | | |
| 06 | STOP | 1.11 | | | | |
| 07 | 12.886 | 2.65 | 1.88300 | 40.76 | 0.5667 | OHARA S-LAH58 |
| 08 | -8.328 | 0.50 | 1.68893 | 31.07 | 0.6004 | OHARA S-TIM28 |
| 09 | 13.306 | 1.53 | | | | |
| 10 | -15.194 | 0.50 | 1.74950 | 35.28 | 0.5869 | OHARA S-LAM7 |
| 11 | -185.357 | 1.00 | 1.85400 | 40.38 | 0.5688 | OHARA L-LAH85V |
| 12* | -19.099 | 11.457 | | | | |
| 13 | ∞ | 1.40 | 1.51633 | 64.14 | | VARIOUS TYPES OF FILTERS |
| 14 | ∞ | | | | | |

FIG. 20

$f = 18.49$, $F = 2.86$, $\omega = 37.9$

| SURFACE NUMBER | R | D | $N_d$ | $\nu d$ | $P_{gF}$ | GLASS TYPE |
|---|---|---|---|---|---|---|
| 01 | 21.912 | 0.80 | 1.58313 | 59.46 | 0.5404 | HOYA M-BACD12 |
| 02* | 13.136 | 2.36 | | | | |
| 03 | -21.409 | 0.60 | 1.63980 | 34.47 | 0.5922 | OHARA S-TIM27 |
| 04 | 8.362 | 2.87 | 1.88300 | 40.76 | 0.5667 | OHARA S-LAH58 |
| 05 | -24.803 | 1.10 | | | | |
| 06 | STOP | 1.20 | | | | |
| 07 | 13.834 | 2.69 | 1.88300 | 40.76 | 0.5667 | OHARA S-LAH58 |
| 08 | -8.699 | 0.50 | 1.68893 | 31.07 | 0.6004 | OHARA S-TIM28 |
| 09 | 11.805 | 1.46 | | | | |
| 10* | -19.158 | 1.00 | 1.85135 | 40.10 | 0.5694 | HOYA M-TAFD305 |
| 11* | -19.589 | 12.755 | | | | |
| 12 | ∞ | 1.40 | 1.51633 | 64.14 | | VARIOUS TYPES OF FILTERS |
| 13 | ∞ | | | | | |

FIG. 21

$f = 17.84$, $F = 2.87$, $\omega = 38.8$

| SURFACE NUMBER | R | D | $N_d$ | $\nu d$ | $P_{gF}$ | GLASS TYPE |
|---|---|---|---|---|---|---|
| 01 | 24.961 | 0.80 | 1.51633 | 64.06 | 0.5333 | OHARA L-BSL7 |
| 02* | 13.937 | 1.92 | | | | |
| 03 | -25.434 | 0.60 | 1.64769 | 33.79 | 0.5938 | OHARA S-TIM22 |
| 04 | 7.318 | 2.79 | 1.88300 | 40.76 | 0.5667 | OHARA S-LAH58 |
| 05 | -27.723 | 0.90 | | | | |
| 06 | STOP | 1.10 | | | | |
| 07 | 15.266 | 2.62 | 1.88300 | 40.76 | 0.5667 | OHARA S-LAH58 |
| 08 | -7.705 | 0.60 | 1.67270 | 32.10 | 0.5988 | OHARA S-TIM25 |
| 09 | 11.738 | 1.47 | | | | |
| 10* | -24.824 | 1.10 | 1.85400 | 40.38 | 0.5688 | OHARA L-LAH85V |
| 11* | -26.317 | 11.597 | | | | |
| 12 | ∞ | 1.40 | 1.51633 | 64.14 | | VARIOUS TYPES OF FILTERS |
| 13 | ∞ | | | | | |

FIG. 22

$f = 18.29$, $F = 2.87$, $\omega = 38.2$

| SURFACE NUMBER | R | D | $N_d$ | $\nu d$ | $P_{gF}$ | GLASS TYPE |
|---|---|---|---|---|---|---|
| 01 | 28.932 | 0.80 | 1.51633 | 64.06 | 0.5333 | OHARA L-BSL7 |
| 02* | 14.947 | 1.79 | | | | |
| 03 | -20.736 | 0.60 | 1.63980 | 34.47 | 0.5922 | OHARA S-TIM27 |
| 04 | 7.987 | 2.82 | 1.88300 | 40.76 | 0.5667 | OHARA S-LAH58 |
| 05 | -24.675 | 0.90 | | | | |
| 06 | STOP | 1.10 | | | | |
| 07 | 14.854 | 2.72 | 1.88300 | 40.76 | 0.5667 | OHARA S-LAH58 |
| 08 | -8.223 | 0.60 | 1.68893 | 31.07 | 0.6004 | OHARA S-TIM28 |
| 09 | 12.851 | 1.55 | | | | |
| 10 | -13.712 | 1.10 | 1.88202 | 37.22 | 0.5769 | HOYA M-TAFD307 |
| 11* | -14.380 | 12.452 | | | | |
| 12 | ∞ | 1.40 | 1.51633 | 64.14 | | VARIOUS TYPES OF FILTERS |
| 13 | ∞ | | | | | |

FIG. 23

$f = 18.28$, $F = 2.87$, $\omega = 38.2$

| SURFACE NUMBER | R | D | $N_d$ | $\nu d$ | $P_{gF}$ | GLASS TYPE |
|---|---|---|---|---|---|---|
| 01 | 17.034 | 0.70 | 1.51633 | 64.06 | 0.5333 | OHARA L-BSL7 |
| 02* | 10.894 | 2.46 | | | | |
| 03 | -18.486 | 0.60 | 1.63980 | 34.47 | 0.5922 | OHARA S-TIM27 |
| 04 | 8.332 | 2.75 | 1.88100 | 40.14 | 0.5701 | HOYA TAFD33 |
| 05 | -25.206 | 1.10 | | | | |
| 06 | STOP | 1.20 | | | | |
| 07 | 13.099 | 2.76 | 1.88100 | 40.14 | 0.5701 | HOYA TAFD33 |
| 08 | -8.666 | 0.50 | 1.69895 | 30.13 | 0.6030 | OHARA S-TIM35 |
| 09 | 12.744 | 1.52 | | | | |
| 10* | -16.835 | 1.00 | 1.88202 | 37.22 | 0.5769 | HOYA M-TAFD307 |
| 11* | -17.510 | 0.70 | | | | |
| 12 | ∞ | 12.807 | 1.51633 | 64.14 | | VARIOUS TYPES OF FILTERS |
| 13 | ∞ | 1.40 | | | | |

FIG. 24

$f = 18.45, \ F = 2.87, \ \omega = 38.0$

| SURFACE NUMBER | R | D | $N_d$ | $\nu_d$ | $P_{gF}$ | GLASS TYPE |
|---|---|---|---|---|---|---|
| 01 | 20.798 | 0.70 | 1.58313 | 59.38 | 0.5423 | OHARA L-BAL42 |
| 02* | 12.110 | 2.46 | | | | |
| 03 | -16.845 | 0.60 | 1.61293 | 37.00 | 0.5862 | OHARA S-TIM3 |
| 04 | 8.688 | 2.98 | 1.83481 | 42.72 | 0.5648 | OHARA S-LAH55V |
| 05 | -20.339 | 1.10 | | | | |
| 06 | STOP | 1.21 | | | | |
| 07 | 11.799 | 2.94 | 1.83481 | 42.72 | 0.5648 | OHARA S-LAH55V |
| 08 | -8.814 | 0.50 | 1.67270 | 32.10 | 0.5988 | OHARA S-TIM25 |
| 09 | 11.699 | 1.60 | | | | |
| 10* | -17.164 | 1.00 | 1.90270 | 31.00 | 0.5943 | OJHARA L-LAH86 |
| 11* | -18.040 | 13.039 | | | | |
| 12 | ∞ | 1.40 | 1.51633 | 64.14 | | VARIOUS TYPES OF FILTERS |
| 13 | ∞ | | | | | |

FIG. 25

$f = 15.70, \ F = 3.27, \ \omega = 42.3$

| SURFACE NUMBER | R | D | $N_d$ | $\nu_d$ | $P_{gF}$ | GLASS TYPE |
|---|---|---|---|---|---|---|
| 01 | 19.742 | 0.70 | 1.58313 | 59.38 | 0.5423 | OHARA L-BAL42 |
| 02* | 11.850 | 2.46 | | | | |
| 03 | -12.492 | 0.60 | 1.59270 | 35.31 | 0.5933 | OHARA S-FTM16 |
| 04 | 9.512 | 2.46 | 1.83481 | 42.72 | 0.5648 | OHARA S-LAH55V |
| 05 | -16.061 | 1.10 | | | | |
| 06 | STOP | 1.20 | | | | |
| 07 | 10.604 | 2.97 | 1.83481 | 42.72 | 0.5648 | OHARA S-LAH55V |
| 08 | -7.496 | 0.50 | 1.67270 | 32.10 | 0.5988 | OHARA S-TIM25 |
| 09 | 12.030 | 1.43 | | | | |
| 10* | -14.261 | 1.00 | 1.90270 | 31.00 | 0.5943 | OHARA L-LAH86 |
| 11* | -17.022 | 10.301 | | | | |
| 12 | ∞ | 1.40 | 1.51633 | 64.14 | | VARIOUS TYPES OF FILTERS |
| 13 | ∞ | | | | | |

FIG. 26

$f = 18.22, \ F = 2.86, \ \omega = 38.4$

| SURFACE NUMBER | R | D | $N_d$ | $\nu_d$ | $P_{g,F}$ | GLASS TYPE |
|---|---|---|---|---|---|---|
| 01 | 17.334 | 0.70 | 1.51633 | 64.06 | 0.5333 | OHARA L-BSL7 |
| 02* | 11.146 | 2.27 | | | | |
| 03 | -24.237 | 0.50 | 1.61293 | 37.00 | 0.5862 | OHARA S-TIM3 |
| 04 | 8.082 | 3.01 | 1.88300 | 40.76 | 0.5667 | OHARA S-LAH58 |
| 05 | -16.270 | 0.50 | 1.64769 | 33.79 | 0.5938 | OHARA S-TIM22 |
| 06 | -96.050 | 1.10 | | | | |
| 07 | STOP | 1.20 | | | | |
| 08 | 13.355 | 2.60 | 1.88300 | 40.76 | 0.5667 | OHARA S-LAH58 |
| 09 | -9.609 | 0.50 | 1.69895 | 30.13 | 0.6030 | OHARA S-TIM35 |
| 10 | 13.696 | 1.50 | | | | |
| 11* | -14.850 | 1.00 | 1.86100 | 37.10 | 0.5785 | OHARA L-LAH94 |
| 12* | -14.692 | 12.603 | | | | |
| 13 | ∞ | 1.40 | 1.51633 | 64.14 | | VARIOUS TYPES OF FILTERS |
| 14 | ∞ | | | | | |

IMAGING LENS, CAMERA, AND PORTABLE INFORMATION TERMINAL DEVICE

CROSS-REFERENCE TO RELATED APPLICATION

This patent application is based on and claims priority pursuant to 35 U.S.C. § 119(a) to Japanese Patent Application No. 2017-225118, filed on Nov. 22, 2017, in the Japan Patent Office, the entire disclosure of which is hereby incorporated by reference herein.

BACKGROUND

Technical Field

Embodiments of the present disclosure relate to an imaging lens, a camera incorporating the imaging lens, and a portable information terminal device incorporating the imaging lens and the camera.

Background Art

Digital cameras that include an imaging lens used to capture an image to be formed on an image sensor are widely used. As one type of digital cameras, there is a great demand for high-quality compact cameras mounted with a single focus lens. Among various types of imaging lenses, "retrofocus" lenses that facilitate wider angles of view are known.

SUMMARY

In one aspect of this disclosure, there is provided an improved imaging lens includes a front lens group having positive refractive power; an aperture stop; and a rear lens group having positive refractive power. The front lens group, the aperture stop, and the rear lens group are arranged in that order from an object side to an image side. An object-side lens closest to an object within the front lens group and an image-side lens closest to an image within the rear lens group are configured so as to form only three air lenses therebetween. The air lens is an air gap between an image-side surface of an object-side lens and an object-side surface of an image-side lens. The object-side lens and the image-side lens is adjacent to each other in an optical axis of the imaging lens. The three air lenses include an object-side air lens disposed closest to the object, an image-side air lens disposed closest to the image, and an intermediate air lens disposed between the object-side air lens and the image-side air lens, the object-side air lens and the image-side air lens being biconvex, and the intermediate air lens being biconcave.

In another aspect of this disclosure, there is provided an improved camera mounted with the above-described imaging lens that serves as an imaging optical system.

In still another aspect of this disclosure, there is provided an improved portable information terminal device including a camera device mounted with the above-described imaging lens that serves an imaging optical system.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 11 is an aberration curve diagram of the imaging lens in FIG. 3;

FIG. 12 is an aberration curve diagram of the imaging lens in FIG. 4;

FIG. 15 is an aberration curve diagram of the imaging lens in FIG. 7;

FIG. 16 is an aberration curve diagram of the imaging lens in FIG. 8;

FIG. 19 is a table of data regarding the imaging lens in FIG. 1;

FIG. 20 is a table of data regarding the imaging lens in FIG. 2;

FIG. 21 is a table of data regarding the imaging lens in FIG. 3;

FIG. 22 is a table of data regarding the imaging lens in FIG. 4;

FIG. 23 is a table of data regarding the imaging lens in FIG. 5;

FIG. 24 is a table of data regarding the imaging lens in FIG. 6;

FIG. 25 is a table of data regarding the imaging lens in FIG. 7; and

FIG. 26 is a table of data regarding the imaging lens in FIG. 8.

Figure 1:
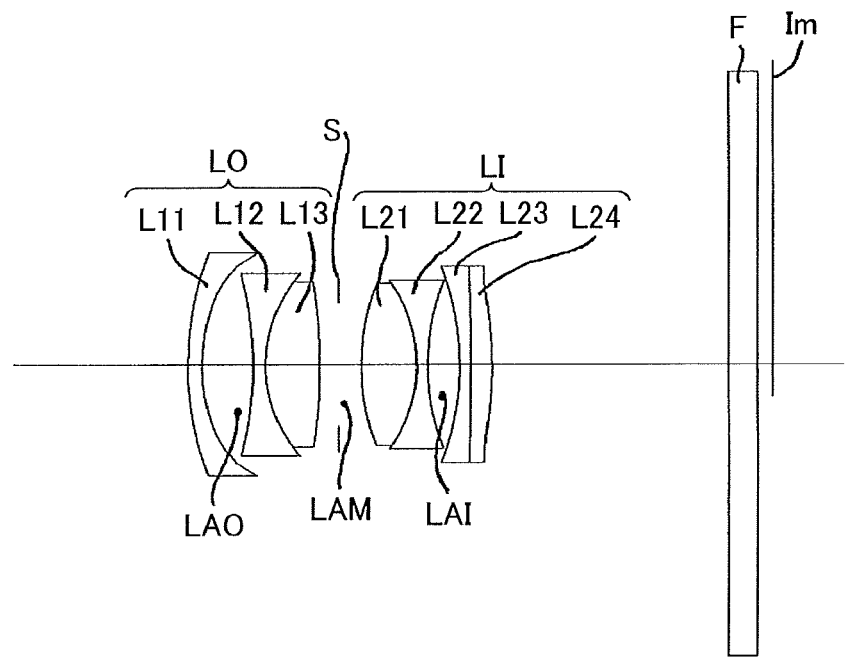
FIG. 1 is a cross-sectional view of an imaging lens according to Example 1 of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

An imaging lens 31 according to at least one embodiment of the present disclosure has a two-lens-group configuration in which a front lens group LO, an aperture stop S, a rear lens group LI are arranged in that order from the object side to the image side.

Each of the front lens group LO and the rear lens group LI has positive refractive power.

The imaging lens 31 has three air lenses between the lens closest to the object and the lens closest to the image, that is, between the lens closest to the object within the front lens group LO and the lens closest to the image within the rear lens group LI.

As well known in the art, an "air lens" is defined as an air gap formed between the image-side surface of the object-side lens and the object-side surface of the image-side lens of two lenses disposed adjacent to each other in the direction of the optical axis.

That is, the image-side surface of the object-side lens of the two lenses forming the air lens is the object-side surface of the air lens, and the object-side surface of the image-side lens of the two lenses forming the air lens is the image-side surface of the air lens.

The imaging lens 31 according to at least one embodiment of the present disclosure includes only three air lenses. That is, only three air gaps are formed between the lens closest to the object and the lens closest to the image.

Three air lenses are sequentially called an "object-side air lens LAO", "intermediate air lens LAM", and "image-side air lens LAI" in that order from the object side to the image side.

The object-side air lens LAO is the air lens formed closest to the object and the "image-side air lens LAI" is the air lens formed closest to the image. These air lenses are both biconvex and have negative refractive power.

The "intermediate air lens LAM" is the air lens formed between the object-side air lens LAO and the image-side air lens LAI. The intermediate air lens LAM is biconcave and has positive refractive power.

The imaging lens 31 of such a configuration as described above is a wide lens with a half angle of view of approximately 35 to 43 degrees, and has a large aperture with an F number of approximately 2.8 to 3.2. Nevertheless, in the imaging lens 31, all the total lens length, the total lens thickness, and the lens diameter can be smaller, and various aberrations can be sufficiently reduced. Moreover, resolution corresponding to the image sensor of 24 million pixels or more can be achieved.

In the imaging lens 31 according to at least one embodiment of the present disclosure, the front lens group LO on the object side relative to the aperture stop S has positive refractive power, and the rear lens group LI on the image side relative to the aperture stop S has positive refractive power. Unlike the retrofocus lenses, the imaging lens 31 has a power arrangement in which negative refractive power, positive refractive power, and negative refractive power are arranged in that order from the object side to the image side in the optical system. With such a power arrangement, coma aberration, distortion aberration, and lateral chromatic aberration can be easily corrected.

To achieve such a power arrangement, the lens system is preferably arranged such that the sign of the refractive power is symmetrical with respect to the aperture stop S, that is, positive refractive power is in the middle of the lens system and negative refractive power is on each side of the positive refractive power. To facilitate achievement of such a power arrangement, preferably, the object-side air lens LAO is formed in the front lens group LO, and the image-side air lens LAI is formed in the rear lens group LI. Further, the intermediate air lens LAM is formed as a gap between the front lens group LO and the rear lens group LI, and the aperture stop S is disposed in the interior of the intermediate air lens LAM.

With such a configuration, the negative refractive powers of the air lenses LAO and LAI balance between both ends of the imaging lens 31 while the positive refractive power of the intermediate air lens LAM balances between the front and back of the aperture stop S. As a result, the substantially symmetrical power arrangement can be obtained without fail, and more successful correction of coma aberration, distortion aberration, and lateral chromatic aberration can be facilitated.

That is, this configuration optimizes the relative positions of the front lens group LO, the rear lens group LI, and the air lenses LAO, LAM, and LAI within the lens system. Accordingly, distortion aberration, coma aberration, and lateral chromatic aberration can be easily corrected in a successful manner. Thus, an image with less distortion can be obtained without any image processing, high resolution can be obtained in an area up to the periphery of angle of view, and a high-quality image can be formed with little color shift and blur.

The object-side air lens LAO included in the front lens group LO is biconvex and has negative refractive power, and the image-side air lens LAI included in the rear lens group LI is also biconvex and has negative refractive power. This configuration achieves the above-described power arrangement.

Further, with the configuration in which the object-side air lens LAO and the image-side air lens LAI are both biconvex, various aberrations can be corrected at a higher level.

The object-side surface of the object-side air lens LAO is configured to be convex. Accordingly, spherical aberration can be appropriately adjusted, and particularly astigmatism can be easily corrected. Further, the image-side surface of the image-side air lens LAI is configured to be convex. Accordingly, the exit pupil distance can be adjusted, and the angle at which the chief ray reaching the peripheral image height hits an image plane can be appropriately determined. Thus, particularly coma aberration and distortion can be easily corrected.

Further, the image-side surface of the object-side air lens LAO is configured to be convex. Accordingly, the lens L11 closest to the object in the front lens group LO can be downsized, and coma aberration of the lower light rays can be easily corrected. Further, the object-side surface of the image-side air lens LAI is configured to be convex. Accordingly, the lens L24 closest to the image in the rear lens group LI can be downsized, and coma aberration of the upper light rays can be easily corrected.

That is, both the object-side air lens LAO and the image-side air lens LAI are configured to be biconvex in the embodiments of the present disclosure. This configuration can achieve the reduction in size and the high performance of the imaging lens 31.

In the embodiments of the present disclosure, the intermediate air lens LAM is configured to have positive refractive power and a biconcave shape. With this configuration, various aberrations can be corrected more successfully.

That is, the intermediate air lens LAM is configured to have a substantially symmetrical power arrangement. With this configuration, coma aberration can be corrected at extremely high level.

The imaging lens 31 according to the embodiments of the present disclosure includes only three air lenses: the object-side air lens LAO, the intermediate air lens LAM, and the image-side air lens LAI. That is, in the present embodiments of the present disclosure, the number of air lenses to be formed within the lens system is reduced so that the lens configuration can be prevented from becoming complicated. This enables a reduction in the size of the device, the total man-hour to assembly the device, and the number of management items, thus leading to quality improvement.

Further, with a reduction in the number of air lenses in the lens system, an air contact surface is reduced so that undesired reflected light from a lens surface can be prevented. As a result, ghost flare can be effectively eliminated or reduced.

Preferably, in the embodiments of the present disclosure, the front lens group LO includes three or four lenses, and the rear lens group LI includes three or four lenses.

Further, the object-side air lens LAO and the image-side air lens LAI are both biconvex in the embodiments of the present disclosure, so as to have relatively strong negative refractive power. Accordingly, strong positive refractive power is to be provided in front and back of the aperture stop S so as to obtain positive focal length over the lens system as a whole in the imaging lens 31.

In order to achieve such a power arrangement reasonably while correcting aberrations such as chromatic aberration and high-order aberration successfully, three or more lenses are to be disposed in each of the front lens group LO and the rear lens group LI.

However, when five or more lenses are disposed in each of the front lens group LO and the rear lens group LI, the reduction in the size of the imaging lens 31 is hampered.

In at least one embodiment of the present disclosure, the lens L11 closest to the object in the front lens group LO preferably has negative refractive power. With such a configuration, slightly retrofocus-like characteristic property can be imparted to the above-described substantially symmetric power arrangement, and a wider angle of view can be achieved while appropriately adjusting the exit pupil distance.

In some embodiments, the lens L11 closest to the image in the rear lens group LI may not have negative refractive power. However, the lens L11 (closest to the image in the rear lens group LI) preferably has relatively weak refractive power so as to achieve the substantially symmetric power arrangement.

The imaging lens 31 according to the embodiments of the present disclosure preferably satisfies any one or more of the following conditional expressions [1] to [8].

$-0.6 < (r1o+r2o)/(r1o-r2o) < 0.2$ [1]

$-0.6 < (r1i+r2i)/(r1i-r2i) < 0.2$ [2]

$0.0 < (r1m+r2m)/(r1m-r2m) < 1.0$ [3]

$0.8 < fF/fR < 3.0$ [4]

$0.7 < Y'/f < 0.95$ [5]

$0.6 < \tan(\theta P \max) < 0.95$ [6]

$1.3 < L/f < 1.9$ [7]

$0.6 < DT/f < 1.1$ [8]

The meanings of the symbols in the parameters of the conditional expressions [1] to [8] are as follows.

The symbols "r1o" and "r2o" in the conditional expression [1] denote the radii of curvature of the object-side surface and the image-side surface of the object-side air lens LAO, respectively. The symbols "r1i" and "r2i" in the conditional expression [2] denote the radii of curvature of the object-side surface and the image-side surface of the image-side air lens LAI, respectively.

The symbols "r1m" and "r2m" in the conditional expression [3] denote the curvature radii of the object-side surface and the image-side surface of the intermediate air lens LAM, respectively.

The symbols "fF" and "fR" in the conditional expression [4] denote the focal length of the front lens group LO and the focal length of the rear lens group LI, respectively.

The symbol "Y'" in the conditional expression [5] denotes a maximum image height. The symbol "f" in the conditional expressions [5], [7], and [8] denotes the focal length of the lens system as a whole when the imaging lens 31 is focused on an object at infinity. The symbol "$\theta P$ max" in the conditional expression [6] denotes an angle at which a chief ray reaching the maximum image height Y' hits the image plane.

The symbol "L" in the conditional expression [7] denotes the distance from the surface closest to the object to the image plane when the imaging lens 31 is focused on an object at infinity. The symbol "DT" in the conditional expression [8] denotes the distance between the surface closest to the object and the surface closest to the image.

The conditional expression [1] defines the balance in refractive power between the object-side surface and the image-side surface of the object-side air lens LAO.

As the object-side air lens LAO is biconvex, r1o is greater than 0 and r2o is less than 0 (r1o>0 and r2o<0).

Accordingly, the denominator of the parameter (r1o+r2o)/(r1o−r2o) is positive. Further, as the parameter increases (decreases), the curvature of the object-side surface decreases (increases) relative to the curvature of the image-side surface.

When the parameter of the conditional expression [1] is less than or equal to the lower limit of −0.6, negative refractive power of the object-side surface of the object-side air lens LAO relatively increases. Accordingly, spherical aberration is more likely to significantly occur in the under direction, and field curvature is more likely to be displaced to the negative side at the intermediate image height.

When the parameter of the conditional expression [1] is greater than or equal to the lower limit of 0.2, negative refractive power of the image-side surface of the object-side air lens LAO relatively increases. Accordingly, spherical aberration is more likely to significantly occur in the over direction, and field curvature is more likely to significantly collapse toward the positive side in the peripheral area. Moreover, coma aberration tends to remain.

The conditional expression [2] defines the balance in refractive power between the object-side surface and the image-side surface of the image-side air lens LAI.

As the image-side air lens LAI is biconvex, r1i is greater than 0 and r2i is less than 0 (r1i>0 and r2i<0).

Accordingly, the denominator of the parameter (r1i+r2i)/(r1i−r2i) is positive. Further, as the parameter increases (decreases), the curvature of the object-side surface decreases (increases) relative to the curvature of the image-side surface.

When the parameter of the conditional expression [2] is less than or equal to the lower limit of −0.6, negative refractive power of the object-side surface of the image-side air lens LAI relatively increases. Accordingly, spherical aberration tends to significantly occur in the over direction, and inner coma aberration tends to remain.

When the parameter of the conditional expression [2] is greater than or equal to the upper limit of 0.2, negative refractive power of the image-side surface of the image-side air lens LAI relatively increases. Accordingly, astigmatism is more likely to occur, and coma aberration tends to be disturbed in the periphery of the pupil.

Within the range in which the conditional expression [2] is satisfied, the position of the exit pupil is easily optimized, and the angle at which the chief ray hits the peripheral image height on the image plane is easily determined.

The conditional expressions [1] and [2] may be satisfied independently, but it is preferable that these conditional expressions are satisfied at the same time.

The conditional expression [3] defines the balance in refractive power between the object-side surface and the image-side surface of the intermediate air lens LAM.

The intermediate air lens is biconcave and has positive refractive power. In the conditional expression [3], r1m is less than 0 and r2m is greater than 0 (r1m<0, r2m>0). The denominator of the parameter (r1m+r2m)/(r1m−r2m) is negative.

When the parameter of the conditional expression [3] is greater than or equal to the upper limit of 1.0, positive refractive power of the image-side surface of the intermediate air lens LAM tends to excessively decrease. When the parameter of the conditional expression [3] is less than or equal to the lower limit of 0, positive refractive power of the object-side surface tends to excessively decrease.

When the shape of the intermediate air lens LAM is adjusted to satisfy the conditional expression [3], coma aberration can be more successfully corrected.

The conditional expression [3] may be satisfied independently, but it is preferable that the conditional expression [3] is combined with one or both the conditional expression [1] and [2] to be satisfied.

The conditional expression [4] defines the range in which positive refractive powers in front and back of the aperture stop S favorably balance.

When the parameter fF/fR of the conditional expression [4] is less than or equal to the lower limit of 0.8, the refractive power of the front lens group LO on the object side relative to the aperture stop S increases relative to the refractive power of the rear lens group LI. Accordingly, distortion tends to curve in the positive direction at the peripheral area, and inner coma aberration tends to occur. Moreover, lateral chromatic aberration of a short wavelength tends to occur inward of the screen.

When the parameter fF/fR of the condition [4] is greater than or equal to the upper limit of 3.0, the refractive power of the rear lens group LI on the image side relative to the aperture stop S relatively increases. Accordingly, negative distortion and outward coma aberration tend to occur, and lateral chromatic aberration of a short wavelength tends to occur outward of the screen.

The conditional expression [5] defines the range of the ratio of the maximum image height to the positive refractive power of the imaging lens 31. The conditional expression [6] defines the angle θP max at which the chief ray reaching the maximum image height hits the image plane.

More specifically, the conditional expression [5] regulates the angle of view to achieve a compact and high-performance imaging lens with a wide angle of view in the most successful manner. Further, the conditional expression [6] defines the above-mentioned angle to achieve a compact and high-performance imaging lens with a wide angle of view in the most successful manner.

It is preferable that these conditional expressions [5] and [6] are satisfied at the same time.

When the conditional expressions [5] and [6] are satisfied at the same time, a compact and high-performance imaging lens with a half angle of view of 35 degrees or more can be achieved.

The conditional expression [7] regulates the total lens length (the distance between the image plane and the surface closest to the object in the lens system) to achieve a compact and high-performance imaging lens with a wide angle of view in the most successful manner.

The conditional expression [8] defines the total lens thickness (the distance between the surface closest to the object and the surface closest to the image in the lens system) to achieve a compact and high-performance imaging lens with a wide angle of view in the most successful manner.

An additional description of the above-described conditional expression [6] is given below.

As described above, "retrofocus" lenses are widely known as a lens that easily achieves a wider angle of view, and are often used as an imaging lens for digital cameras.

Since an image sensor (area sensor) includes a color filter or a microlens for each pixel, there is a need for the position of the exit pupil to be away from the image plane, and for the peripheral light beams to strike the photo-sensing plane of an area sensor at a substantially right angle. This is one reason why the retrofocus lens is used as the imaging lens for digital cameras.

As is well known, the back focus of the retrofocus imaging lens tends to be long, and it is difficult to miniaturize cameras and portable information terminal devices mounted with such a retrofocus imaging lens.

On the other hand, in a relatively large image sensor having a diagonal length of about 20 to 45 mm, due to improvements and optimization of on-chip microlenses and progress of image processing, any troubles might not occur even if peripheral light beams strikes the photo-sensing plane obliquely to some extent.

Specifically, it is possible to construct a system that allows the angle between the chief ray and the optical axis at the maximum image height to be about 35 to 40 degrees.

In the conditional expression [6], the upper limit of 0.70 for the parameter: tan(θP max) corresponds to 37 degrees and the lower limit of 0.50 corresponds to 27 degrees. However, even with such a large angle of the chief ray reaching the maximum image height to the image plane, sufficient imaging performance can be achieved using the image sensor as described above. Further, large images can be captured by using a large image sensor.

As described above, it is preferable that the lens closest to the object in the front lens group LO has negative refractive power. With such a configuration, slightly retrofocus-like characteristic property can be imparted to the above-described substantially symmetric power arrangement, and a wider angle of view can be achieved while appropriately adjusting the exit pupil distance.

When the lens closest to the object in the front lens group LO is configured to be a negative lens, the focal length f1 preferably satisfies the following conditional expression [9].

$$-4.0 < f1/f < -2.2 \quad [9]$$

where f1 denotes a focal length of a lens closest to the object in the front lens group, the lens having negative refractive power, and f denotes a focal length of the imaging lens as a whole when the imaging lens is focused on an object at infinity.

When the parameter: f1/f of the conditional expression [9] is less than or equal to the lower limit value of −4.0, the refractive power of the front lens group LO decreases. As a result, field curvature tends to lack in correction and the flatness of the image plane becomes difficult to maintain.

When the parameter: f1/f is greater than or equal to the upper limit of −2.2, the refractive power of the front lens group LO increases. As a result, astigmatism and coma aberration are likely to remain, and it is difficult to maintain high imaging performance in an area up to the peripheral area.

In this case, the negative lens closest to the object in the front lens group LO may be a single lens or a cemented lens.

When a negative lens (which may be a single lens or a cemented lens) is disposed closest to the object in the front lens group LO, the negative lens is defined as a negative lens (a first negative lens) with a concave surface facing the image side. Further, another negative lens (a second negative lens) with a concave surface facing the object side is disposed next to the first negative lens, on the image side relative to the first negative lens. An air lens (object-side air lens LAO) of a biconvex shape is preferably formed between the first negative lens with a concave surface facing the image side and the second negative lens with a concave surface facing the object side. In this case, a single meniscus lens having a concave surface facing the object side or a meniscus cemented lens as a whole having a concave surface facing the object side is disposed closest to the image in the rear lens group LI. Further, a negative lens (third negative lens) with a concave surface facing the image side is disposed on the object side relative to that meniscus lens. An air lens of a biconvex shape (image-side air lens LAI) is preferably formed between the meniscus lens (single lens or cemented lens) and the third negative lens with a concave surface facing the image side.

In this configuration, the following conditional formula [10] is satisfied where fFF denotes the focal length of the negative lens (the first negative lens) with the concave surface facing the image side, disposed closest to the object and fRR denotes the focal length of the single meniscus lens or cemented meniscus lens with a concave surface facing the object side, disposed closest to the image.

$$-0.4 < fFF/fRR < 0.6 \quad [10]$$

When the parameter of the conditional expression [10] is less than or equal to the lower limit of −0.4, the retrofocus-like characteristic property of the imaging lens increases, and the principal point moves toward the image side. As a result, the total lens length is difficult to shorten.

In addition, the exit pupil moves to the object side, and the diameter of the lens closest to the image easily increases.

When the parameter of the conditional expression [10] is greater than or equal to the upper limit of 0.65, the telephoto-like characteristic property of the imaging lens increases, and the principal point moves to the object side. As a result, the total lens length becomes short so that the degree of freedom of correction of various aberrations is restricted or the manufacturing error sensitivity tends to increase.

Also, the exit pupil moves to the image side, and the angle (θP max) at which the chief ray reaching the peripheral image height hits the image plane tends to become large.

More preferably, the parameter: fFF/fRR of the conditional expression [10] satisfies the following conditional expression [10A]:

$$-0.2 < fFF/fRR < 0.5 \quad [10A]$$

For better aberration correction, it is preferable for both the lens closest to the object and the lens closest to the image in the rear lens group LI to have an aspherical surface. Such a configuration is very advantageous for correction of astigmatism, coma aberration, and distortion aberration.

It should be noted that the imaging lens according to at least one embodiment of the present disclosure is preferably a single focal lens. In this case, focusing can be performed by moving the imaging lens 31 as a whole.

The imaging lens 3 according to at least one embodiment of the present disclosure can be used as a photographing lens of a camera, particularly a digital camera, and can be used as a photographing lens of a camera device in a portable information terminal device.

The following describes a portable information terminal device 30 according to an embodiment of the present disclosure with reference to FIGS. 17A, 17B, 17C and 18.

Figure 17A:
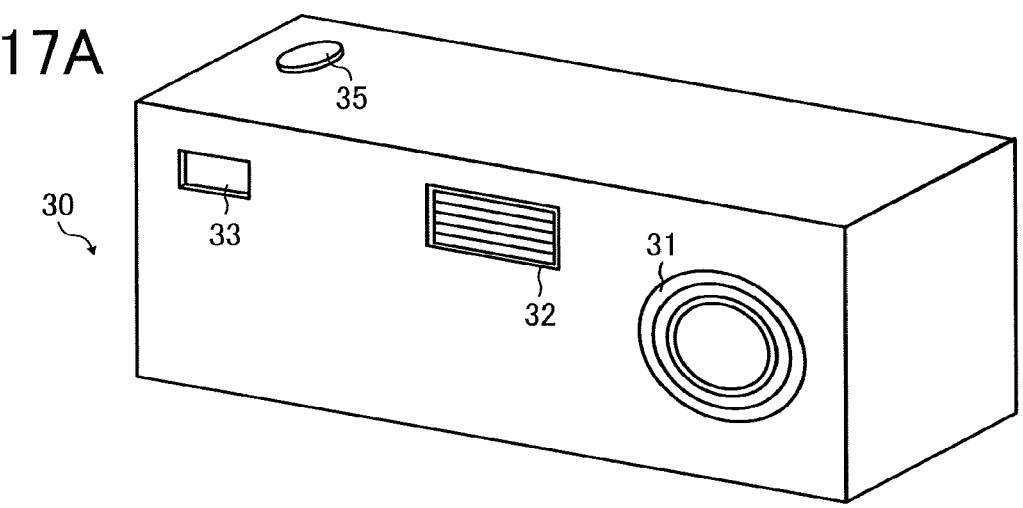
FIGS. 17A, 17B, and 17C are illustrations of a portable information terminal device according to an embodiment of the present disclosure.
Figure 17B:
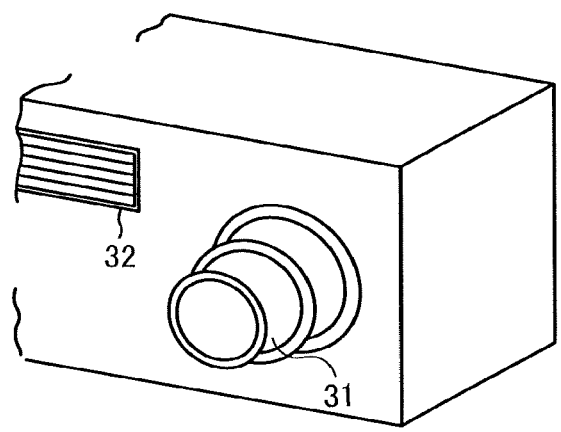
Figure 17C:
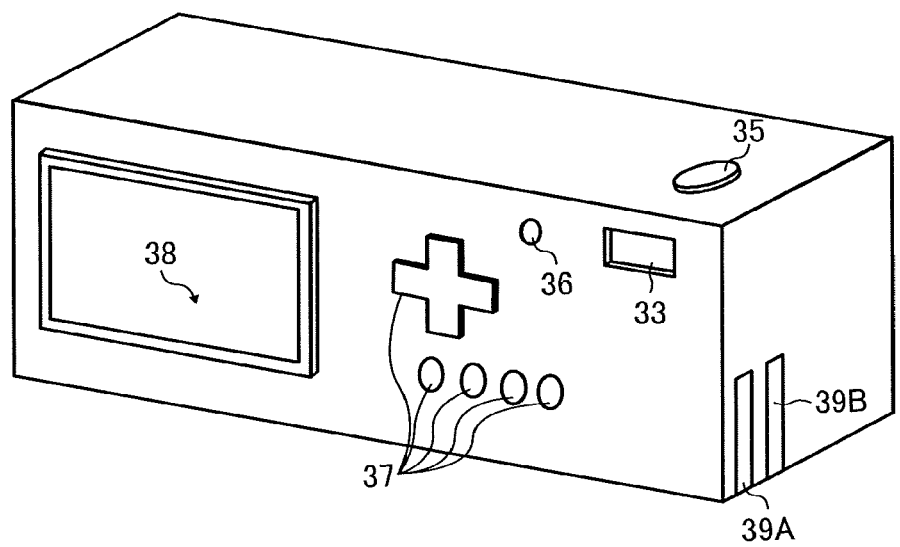
Figure 18:
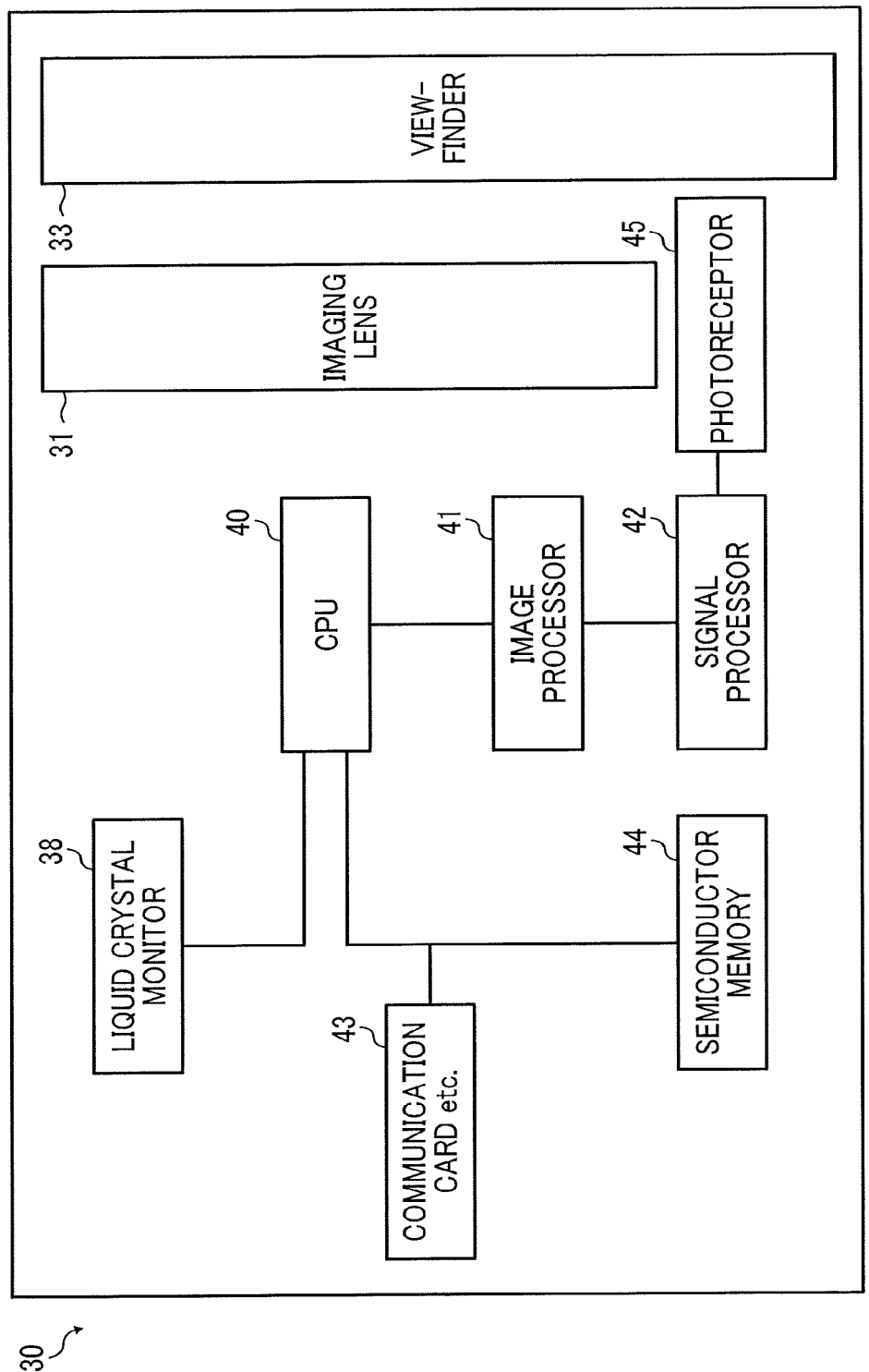
FIG. 18 is a system diagram of the portable information terminal device of FIG. 17.

FIGS. 17A, 17B, 17C are illustrations of external appearances of the portable information terminal device 30, and FIG. 18 is a diagram for explaining the appearance of the portable information terminal device, and FIG. 18 is a system chart.

As illustrated in FIG. 18, the portable information terminal device 30 includes the imaging lens 31 and a photoreceptor 45 as an image sensor. The imaging lens 31 forms an image of an object to be captured, onto a photo-sensing surface of the photoreceptor 45, and the photoreceptor 45 reads the formed image.

The portable information terminal device 30 further includes a central processing unit (CPU) 40, an image processor 41, a signal processor 42, a semiconductor memory 44, and a liquid crystal monitor 38. The CPU 40 controls the signal processor 42 to convert data output from the photoreceptor 45 into digital data (image data). The digital image data processed by the signal processor 42 is further subjected to a predetermined image processing by the image processor 41 under control of the CPU 400, and recorded in the semiconductor memory 44.

The liquid crystal monitor 38 can display an image that is being captured as well as an image that is recorded in the semiconductor memory 44. An image stored in the semiconductor memory 44 may be transferred to an external device by using a data communication card 43 or the like.

As illustrated in FIG. 17A, when the camera is being carried, the imaging lens 31 is retracted inside the camera. When the user turns on the camera by operating the power switch 35, the lens barrel is extended as illustrated in FIG. 17B. The power switch 35 also serves as a "shutter button," and is hereinafter referred to also as a shutter button.

The imaging lens 31 can change a cropping range in an image to change the magnification in a pseudo manner by operating a zoom lever, which is a so-called digital zoom operation. At the same time, the viewfinder 33 also changes the magnification in synchronization with a change in angle of view.

Focusing is performed when a shutter button 4 is pressed halfway down (as described above, the imaging lens 31 as a whole is integrally moved in the direction of the optical axis). Alternatively, focusing may be performed by moving the photoreceptor 45. When the shutter button 35 is fully depressed, the image processing is performed as described above.

When an image recorded in the semiconductor memory 44 is displayed on the LCD monitor 38 or transmitted to another device by using the data communication card 43, an operation key 37 is operated. The semiconductor memory 44 and the data communication card 43 are inserted into a dedicated or general-purpose slots 39A and 39B when used.

When the imaging lenses 31 is retracted inside the camera, all the lens groups may not be arranged along the optical axis. For example, when the front lens group LO shifts away from the optical axis and is stored in parallel with the rear lens group LI, further slimming down of the imaging device is achieved.

The imaging lens 31 according to any one of Examples 1 to 8 is used in such a portable information terminal device, as the photographing optical system. Accordingly, a compact and high-quality portable information terminal device incorporating a photoreceptor (image sensor) of 24 million pixels or more can be provided.

Example

The following describes the imaging lens 31 according to Examples 1 to 8 of the present disclosure. In Examples 1 to 8, the maximum image height (Y') is 14.2 mm.

FIGS. 1 to 8 are cross-sectional views of the imaging lenses 31 according to Examples 1 to 8, respectively. In FIGS. 1 to 8, the left side is an object side, and the right side is an image side. The same reference signs are given to corresponding elements in FIGS. 1 to 8 to facilitate understanding of the elements.

In each of Examples 1 to 8, it is assumed that the image of the object to be captured by the imaging lens 31 is read by the image sensor (the area sensor, the above-described photoreceptor 45). In each of FIGS. 1 to 8, the symbol "F" denotes a transparent parallel plate optically equivalent to various types of filters such as an optical low pass filter and infrared cut-off filter of the image sensor, or a cover glass of the image sensor (a charge-coupled device (CCD) area sensor or a complementary metal oxide semiconductor (CMOS) sensor). Further, the symbol "Im" denotes a photo-sensing surface of the image sensor.

The image to be read is formed on the photo-sensing surface Im.

In each of Examples 1 to 8, the parallel plate F is disposed such that the image-side surface of the parallel plate F is positioned about 0.7 mm away from the photo-sensing surface Im, on the object side relative to the photo-sensing surface IM.

The lenses constituting each lens group are denoted by reference numerals as follows.

In the lens constituting the front lens group LO, L1i denotes the i-th lens counted from the object side. In the lens constituting the rear lens group LI, L2j denotes the j-th lens counted from the object side (aperture stop S side).

The meanings of symbols in Examples 1 through 8 are described below.
f: focal length of the lens system as a whole;
F: F number;
ω: half angle of view (degree);
R: radius of curvature;
D: distance between surfaces (which is referred to also as surface distance);
Nd: refractive index;
vd: the Abbe number;
Pg, F: Partial dispersion ratio [Pg, F=(ng−nF)/(nF−nC)];
K: conic constant of aspherical surface;
A4: 4th order aspherical coefficient;
A6: 6th order aspherical coefficient;
A8: 8th order aspherical coefficient;
A10: 10th order aspherical coefficient;
A12: 12th order aspherical coefficient; and
A14: 14th order aspherical coefficient.

The aspherical surface is represented by the following formula using the above-described conic constant and aspherical surface coefficient, where the symbol "C" denotes an inverse number of a paraxial radius of curvature (a paraxial curvature) and the symbol "H" denotes the height from the optical axis.

$$X = \{CH^2/1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} * H^{14}$$

The unit of length, which is a dimension, is mm unless otherwise mentioned.

The "surface number" refers to counted numbers of surfaces (the lens surfaces and the surface of the aperture stop S to be indicated below as stop S) sequentially counted from the object side.

Example 1

Example 1 relates to the imaging lens 31 of which the cross section is illustrated in FIG. 1.

FIG. 19 is a table of the data regarding the imaging lens 31 according to Example 1.

[Data Regarding Aspherical Surface]

The symbol "*" is given to the surface number of the aspherical surface in data. The same applies to Examples 2 through 8 below.

The aspherical data are listed below.
The Second Surface
K=0.0
A4=2.33316×10$^{-4}$
A6=1.10838×10$^{-5}$
A8=−6.37281×10$^{-7}$
A10=4.94580×10$^{-8}$
A12=−1.63466×10$^{-9}$
A14=2.59857×10$^{-11}$
The Twelfth Surface
K=8.55425
A4=4.627224×10$^{-4}$
A6=8.45387×10$^{-6}$
A8=1.31568×10$^{-8}$
A10=2.78765×10$^{-9}$ Values of parameters in conditional expressions are listed below.

$(r1o+r2o)/(r1o-r2o)=-0.303$ [1]

$(r1i+r2i)/(r1i-r2i)=-0.066$ [2]

$(r1m+r2m)/(r1m-r2m)=0.376$ [3]

$fF/fR=2.388$ [4]

$Y'/f=0.830$ [5]

$\tan(\theta P \max)=0.841$ [6]

$L/f=1.646$ [7]

$DT/f=0.853$ [8]

$f1/f=-3.254$ [9]

$fFF/fRR=0.211$ [10]

Second Example

Figure 2:
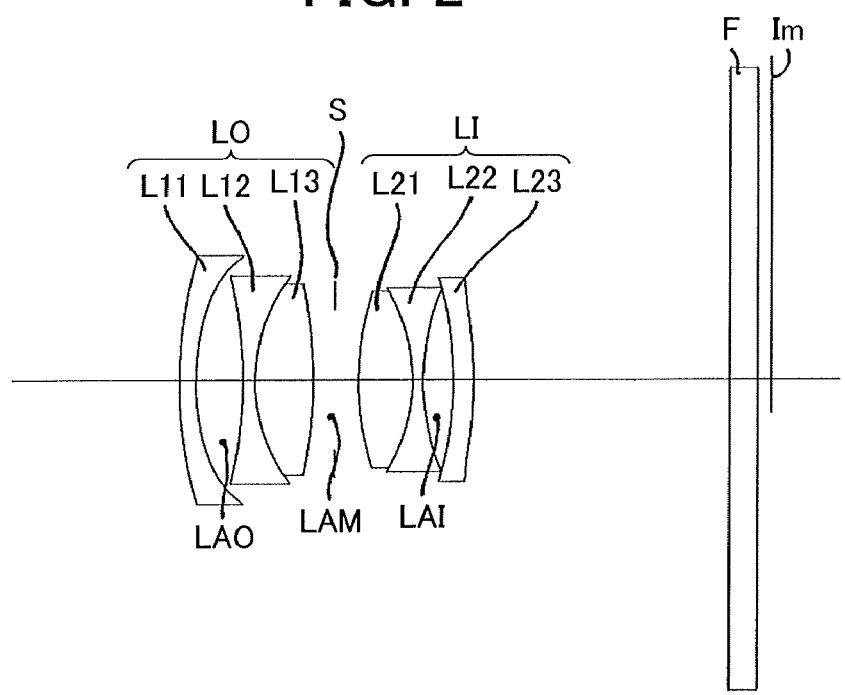
FIG. 2 is a cross-sectional view of an imaging lens according to Example 2 of the present disclosure.

Example 2 relates to the imaging lens 31 of which the cross section is illustrated in FIG. 2. FIG. 20 is a table of the data regarding the imaging lens 31 according to Example 2.
[Data Regarding Aspherical Surface]
The aspherical data are listed below.
The Second Surface
$K=0.0$,
$A4=2.68967\times10^{-4}$,
$A6=-4.58263\times10^{-7}$,
$A8=4.00133\times10^{7}$,
$A10=-1.35475\times10^{-8}$,
$A12=3.17395\times10^{-10}$,
$A14=-1.36710\times10^{-12}$
Aspherical Surface; the Tenth Surface
$K=0.0$,
$A4=8.14051\times10^{-5}$,
$A6=-5.35844\times10^{-6}$
The Eleventh Surface
$K=8.84476$,
$A4=4.57704\times10^{-4}$,
$A6=2.52368\times10^{-6}$,
$A8=6.66033\times10^{-9}$,
$A10=3.97299\times10^{-9}$
Values of parameters in the conditional expressions are listed below.

$(r1o+r2o)/(r1o-r2o)=-0.239$ [1]

$(r1i+r2i)/(r1i-r2i)=-0.237$ [2]

$(r1m+r2m)/(r1m-r2m)=0.284$ [3]

$fF/fR=1.541$ [4]

$Y'/f=0.768$ [5]

$\tan(\theta P \max)=0.773$ [6]

$L/f=1.592$ [7]

$DT/f=0.789$ [8]

$f1/f=-3.148$ [9]

$fFF/fRR=-0.004$ [10]

Third Example

Figure 3:
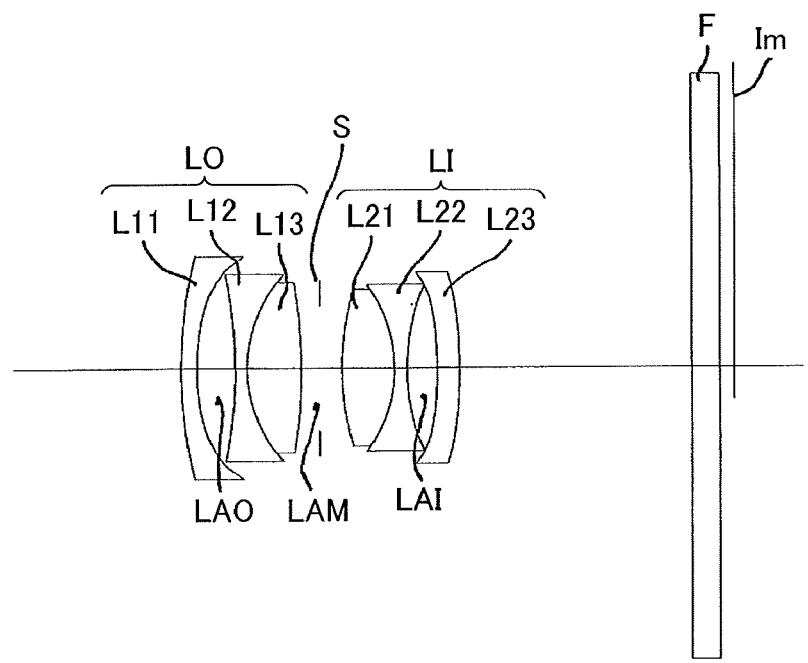
FIG. 3 is a cross-sectional view of an imaging lens according to Example 3 of the present disclosure.

Example 3 relates to the imaging lens 31 of which the cross section is illustrated in FIG. 3. FIG. 21 is a table of the data regarding the imaging lens 31 according to Example 3.
[Data Regarding Aspherical Surface]
The aspherical data are listed below.
The Second Surface
$K=0.0$,
$A4=3.72951\times10^{-4}$,
$A6=3.24602\times10^{-6}$,
$A8=5.33404\times10^{-8}$,
$A0=2.01818\times10^{8}$,
$A12=-9.51799\times10^{-10}$,
$A14=1.91260\times10^{-11}$
The Tenth Surface
$K=0.0$,
$A4=-3.28215\times10^{-4}$,
$A6=-1.83240\times10^{-5}$
The Eleventh Surface
$K=19.98002$,
$A4=9.73270 \ 10^{-5}$,
$A6=-3.03423\times10^{-}$,
$A8=-1.89893\times10^{-7}$,
$A10=1.32511\times10^{-8}$
Values of parameters in the conditional expressions are listed below.

$(r1o+r2o)/(r1o-r2o)=-0.292$ [1]

$(r1i+r2i)/(r1i-r2i)=-0.358$ [2]

$(r1m+r2m)/(r1m-r2m)=0.290$ [3]

$fF/fR=1.223$ [4]

$Y'/f=0.796$ [5]

$\tan(\theta P \max)=0.828$ [6]

$L/f=1.547$ [7]

$DT/f=0.779$ [8]

$f1/f=-3.512$ [9]

$fFF/fRR=0.081$ [10]

Example 4

Figure 4:
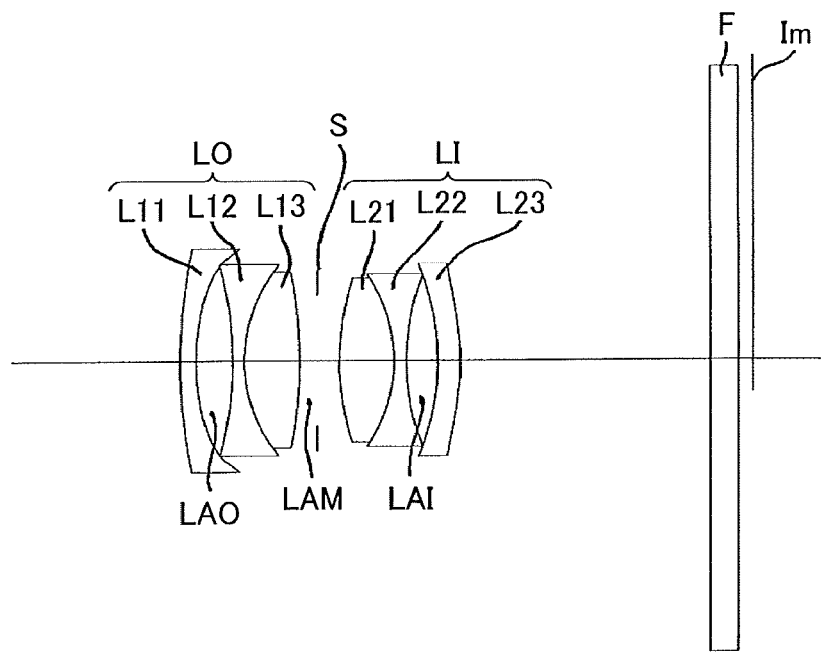
FIG. 4 is a cross-sectional view of an imaging lens according to Example 4 of the present disclosure.

Example 4 relates to the imaging lens 31 of which the cross section is illustrated in FIG. 4. FIG. 22 is a table of the data regarding the imaging lens 31 according to Example 4.
[Data Regarding Aspherical Surface]
The aspherical data are listed below.
The Second Surface
$K=0.0$,
$A4=2.67419\times10^{-4}$,
$A6=1.46337\times10^{-5}$,
$A8=-1.15262\times10^{-6}$,
$A10=8.30471\times10^{-8}$,
$A12=-2.70440\times10^{9}$,
$A14=3.79775\times10^{-11}$
The Eleventh Surface
$K=1.42113$,
$A4=2.87593\times10^{-4}$,
$A6=4.81917\times10^{-}$,
$A8=4.83416\times10^{-8}$,
$A10=6.12592\times10^{-10}$
Values of parameters in the conditional expressions are listed below.

$(r1o+r2o)/(r1o-r2o)=-0.162$ [1]

$(r1i+r2i)/(r1i-r2i)=-0.032$ [2]

$(r1m+r2m)/(r1m-r2m)=0.248$ [3]

$fF/fR=1.462$ [4]

$Y'/f=0.776$ [5]

$\tan(\theta P \max)=0.777$ [6]

$L/f=1.560$ [7]

$DT/f=0.764$ [8]

$f1/f=-3.339$ [9]

$fFF/fRR=0.042$ [10]

Example 5

Figure 5:
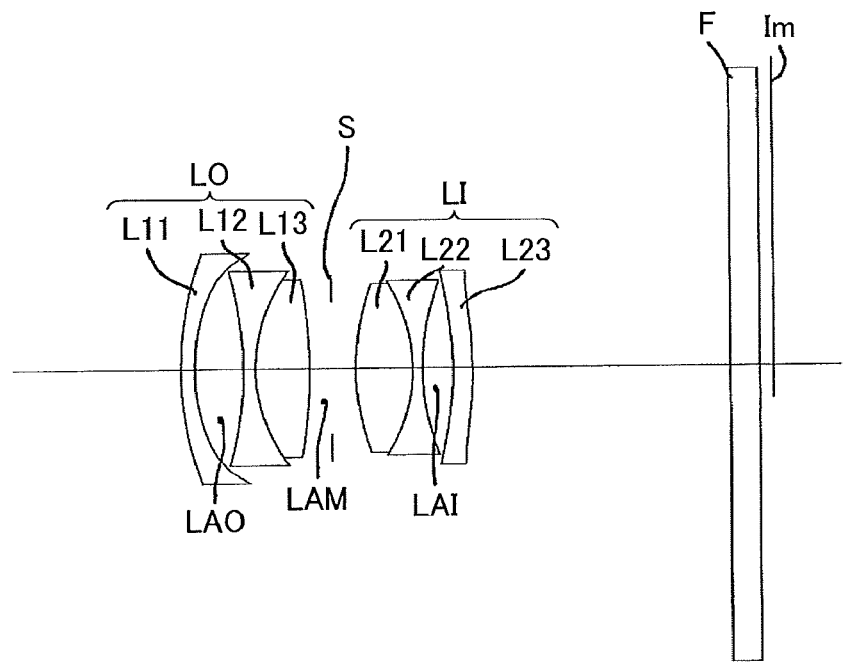
FIG. 5 is a cross-sectional view of an imaging lens according to Example 5 of the present disclosure.

Example 5 relates to the imaging lens 31 of which the cross section is illustrated in FIG. 5. FIG. 23 is a table of the data regarding the imaging lens 31 according to Example 5.
[Data Regarding Aspherical Surface]
The aspherical data are listed below.
The Second Surface
K=0.0,
A4=2.49546×10$^{-4}$,
A6=5.30767×10$^-$,
A8=−1.77772×10$^{-7}$,
A10=2.52567×10$^{-8}$,
A12=−9.46560×10$^{-10}$,
A14=1.70552×10$^{-11}$
The Tenth Surface
K=0.0,
A4=2.21965×10$^{-4}$,
A6=−7.84181×10 7
The Eleventh Surface
K=7.28422,
A4=6.02712×10$^{-4}$,
A6=8.85505×10$^{-6}$,
A8=−5.39399×10$^{-8}$,
A10=4.60086×10$^{-9}$
Values of parameters in the conditional expressions are listed below.

$(r1o+r2o)/(r1o-r2o)=-0.258$ [1]

$(r1i+r2i)/(r1i-r2i)=-0.138$ [2]

$(r1m+r2m)/(r1m-r2m)=0.316$ [3]

$fF/fR=2.294$ [4]

$Y'/f=0.777$ [5]

$\tan(\theta P \max)=0.769$ [6]

$L/f=1.613$ [7]

$DT/f=0.798$ [8]

$f1/f=-3.331$ [9]

$fFF/fRR=0.038$ [10]

Example 6

Figure 6:
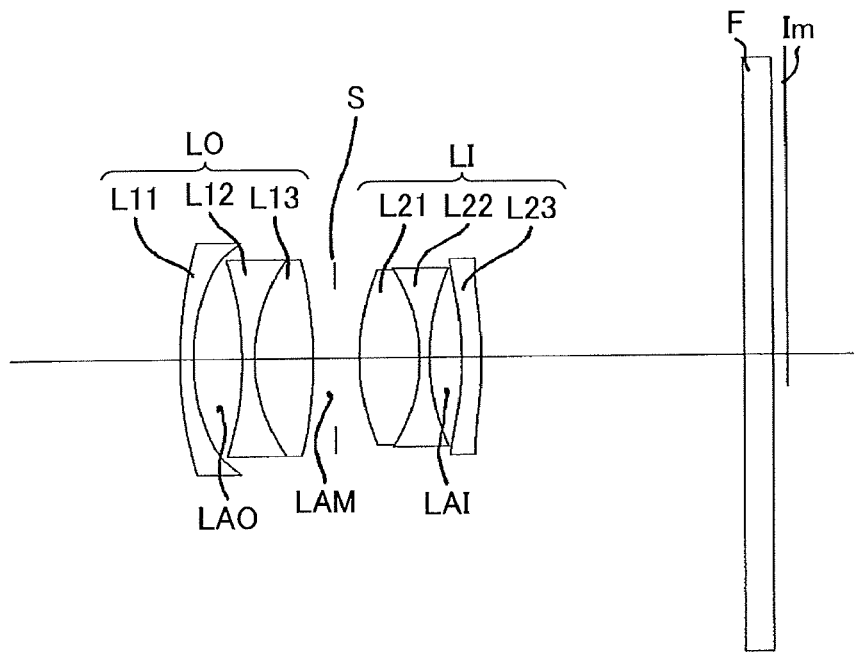
FIG. 6 is a cross-sectional view of an imaging lens according to Example 6 of the present disclosure.

Example 6 relates to the imaging lens 31 of which the cross section is illustrated in FIG. 6. FIG. 24 is a table of the data regarding the imaging lens 31 according to Example 6.
[Data Regarding Aspherical Surface]
The aspherical data are listed below.
The Second Surface
K=0.0,
A4=2.25513×10$^{-4}$,
A6=5.62684×10$^{-6}$,
A8=−3.11498×10$^{-7}$,
A10=2.96319×10$^{-8}$,
A12=−9.92939×10$^{-10}$,
A14=1.49463×10$^{-11}$
The Tenth Surface
K=0.0,
A4=2.67595×10$^{-4}$,
A6=−7.23834×10$^{-8}$
The Eleventh Surface
K=8.02127,
A4=6.35106×10$^{-4}$,
A6=1.02195×10$^{-5}$,
A8=−9.60305×10$^{-8}$,
A10=6.19345×10$^{-9}$
Values of parameters in the conditional expressions are listed below.

$(r1o+r2o)/(r1o-r2o)=-0.164$ [1]

$(r1i+r2i)/(r1i-r2i)=-0.189$ [2]

$(r1m+r2m)/(r1m-r2m)=0.266$ [3]

$fF/fR=2.348$ [4]

$Y'/f=0.770$ [5]

$\tan(\theta P \max)=0.755$ [6]

$L/f=1.638$ [7]

$DT/f=0.818$ [8]

$f1/f=-2.777$ [9]

$fFF/fRR=0.060$ [10]

Example 7

Figure 7:
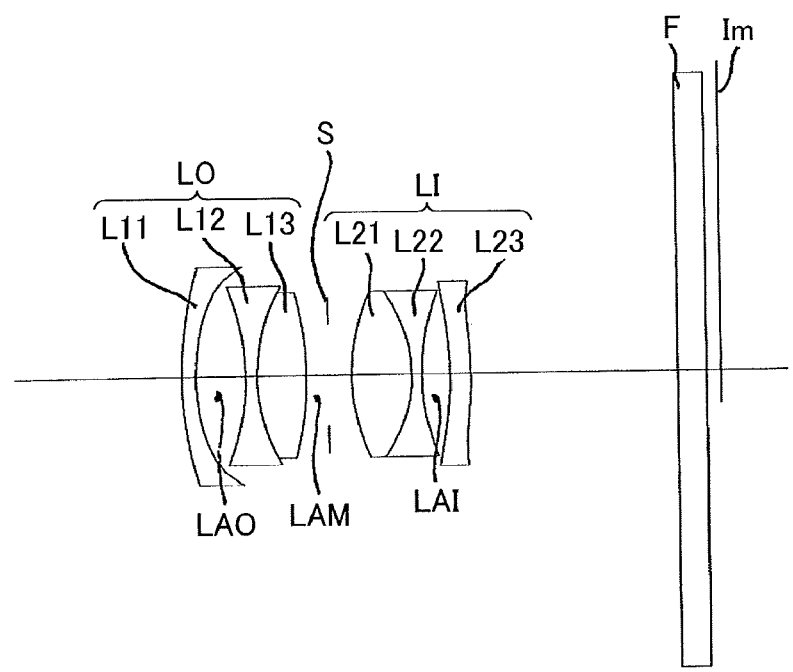
FIG. 7 is a cross-sectional view of an imaging lens according to Example 7 of the present disclosure.

Example 7 relates to the imaging lens 31 of which the cross section is illustrated in FIG. 7. FIG. 25 is a table of the data regarding the imaging lens 31 according to Example 7.
[Data Regarding Aspherical Surface]
The aspherical data are listed below.
The Second Surface
K=0.0,
A4=2.71502×10$^{-4}$,
A6=9.04308×10$^{-6}$,
A8=−6.14012×10$^{-7}$,
A10=5.78048×10$^{-8}$,
A12=−2.15199×10$^{-9}$,
A14=3.93607×10$^{-11}$
The Tenth Surface
K=0.0,
A4=5.77816×10$^{-4}$,
A6=−3.98329×10$^{-6}$
The Eleventh Surface
K=5.29089,
A4=1.01998×10$^{-3}$,
A6=1.03128×10$^{-5}$,
A8=−3.03249×10$^{-8}$,
A10=1.61176×10$^{-9}$ Values of parameters in the conditional expressions are listed below.

$(r1o+r2o)/(r1o-r2o)=-0.026$ [1]

$(r1i+r2i)/(r1i-r2i)=-0.085$ [2]

$(r1m+r2m)/(r1m-r2m)=0.205$ [3]

$fF/fR=2.525$ [4]

$Y'/f=0.905$ [5]

$\tan(\theta P\ max)=0.925$ [6]

$L/f=1.709$ [7]

$DT/f=0.919$ [8]

$f1/f=-3.348$ [9]

$fFF/fRR=0.447$ [10]

Example 8

Figure 8:
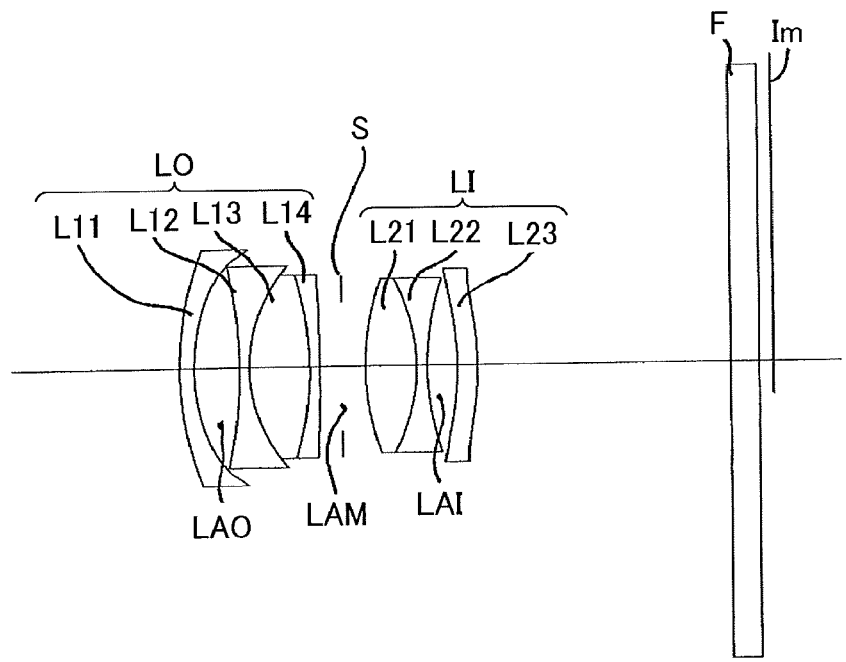
FIG. 8 is a cross-sectional view of an imaging lens according to Example 8 of the present disclosure.

Example 8 relates to the imaging lens 31 of which the cross section is illustrated in FIG. 8. FIG. 26 is a table of the data regarding the imaging lens 31 according to Example 8.
[Data Regarding Aspherical Surface]
The aspherical data are listed below.
The Second Surface
K=0.0,
A4=2.18458×10$^{-4}$
A6=5.08624×10$^{-6}$,
A8=−2.14277×10$^{-7}$,
A10=2.25859×10$^{-8}$,
A12=−7.62695×10$^{-10}$,
A14=1.19420×10$^{-11}$
The Eleventh Surface
K=0.0,
A4=2.19633×10$^{-4}$,
A6=6.49562×10$^{-6}$
The Twelfth Surface
K=4.40626,
A4=5.86981×10$^{4}$,
A6=1.34609×10$^{-5}$,
A8=1.74349×10$^{-8}$,
A10=1.99268×10$^{-9}$
Values of parameters in each conditional expression are listed below.

$(r1o+r2o)/(r1o-r2o)=-0.370$ [1]

$(r1i+r2i)/(r1i-r2i)=-0.040$ [2]

$(r1m+r2m)/(r1m-r2m)=0.756$ [3]

$fF/fR=2.611$ [4]

$Y'/f=0.779$ [5]

$\tan(\theta P\ max)=0.791$ [6]

$L/f=1.624$ [7]

$DT/f=0.817$ [8]

$f1/f=-3.452$ [9]

$fFF/fRR=-0.154$ [10]

Figure 9:
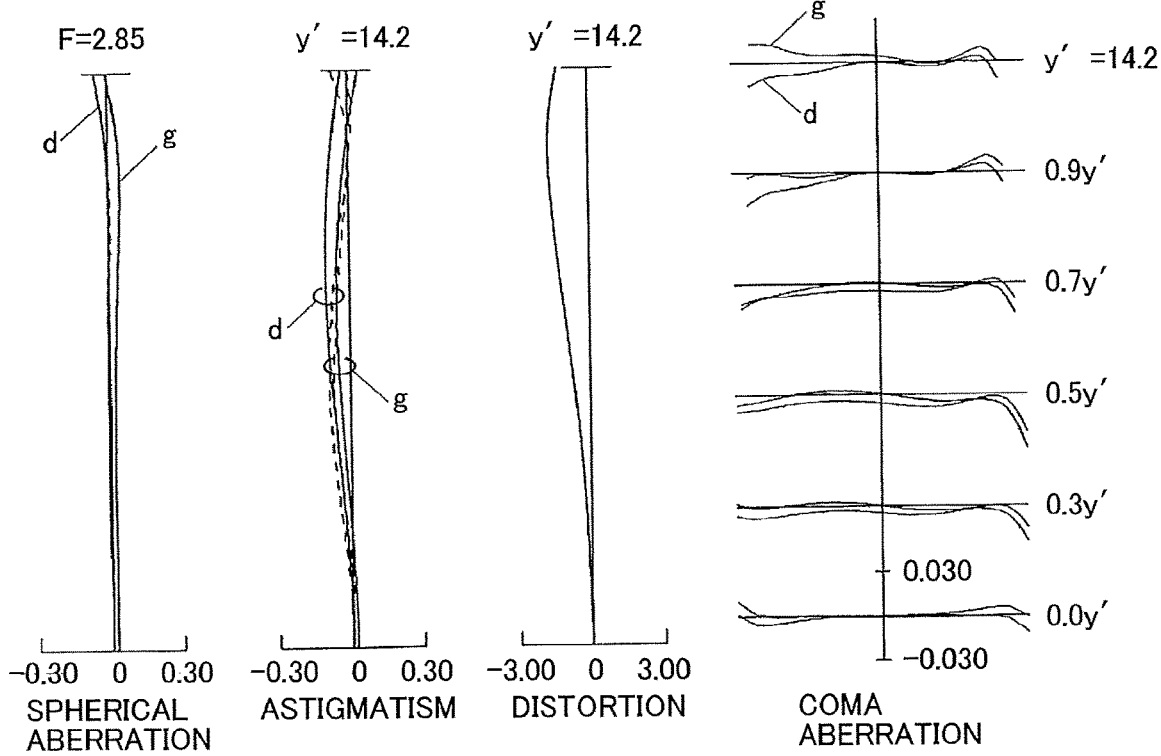
FIG. 9 is an aberration curve diagram of the imaging lens in FIG. 1.
Figure 10:
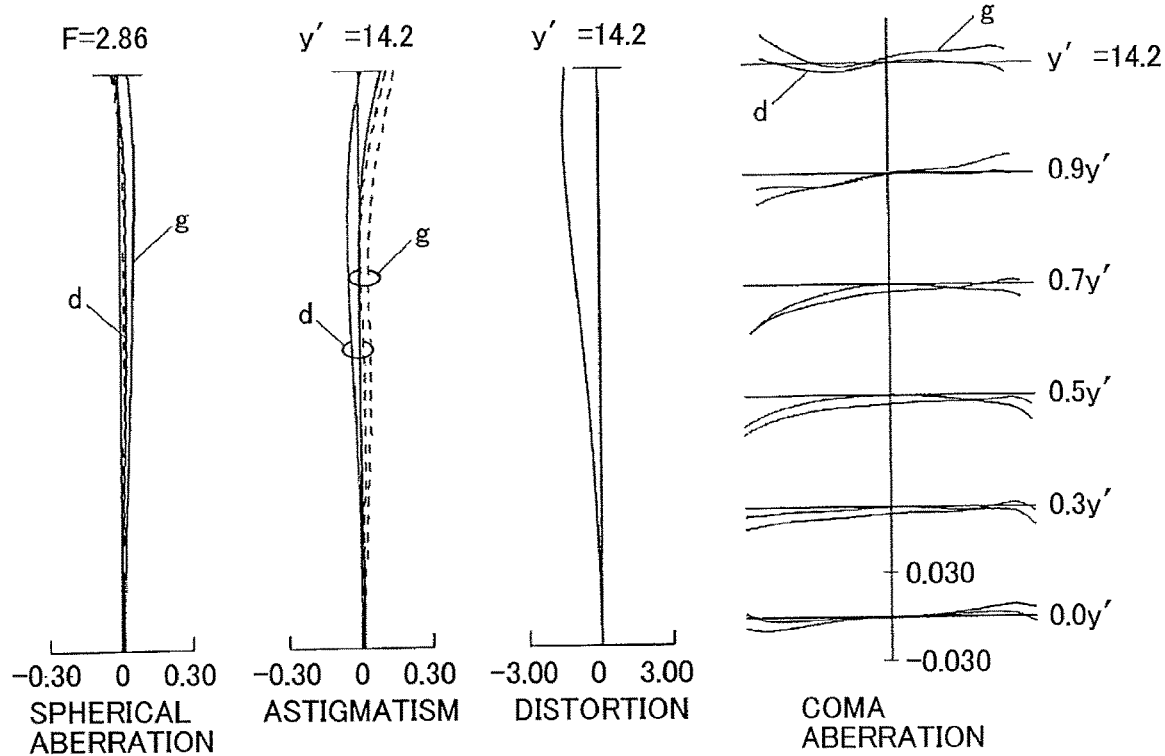
FIG. 10 is an aberration curve diagram of the imaging lens in FIG. 2.
Figure 13:
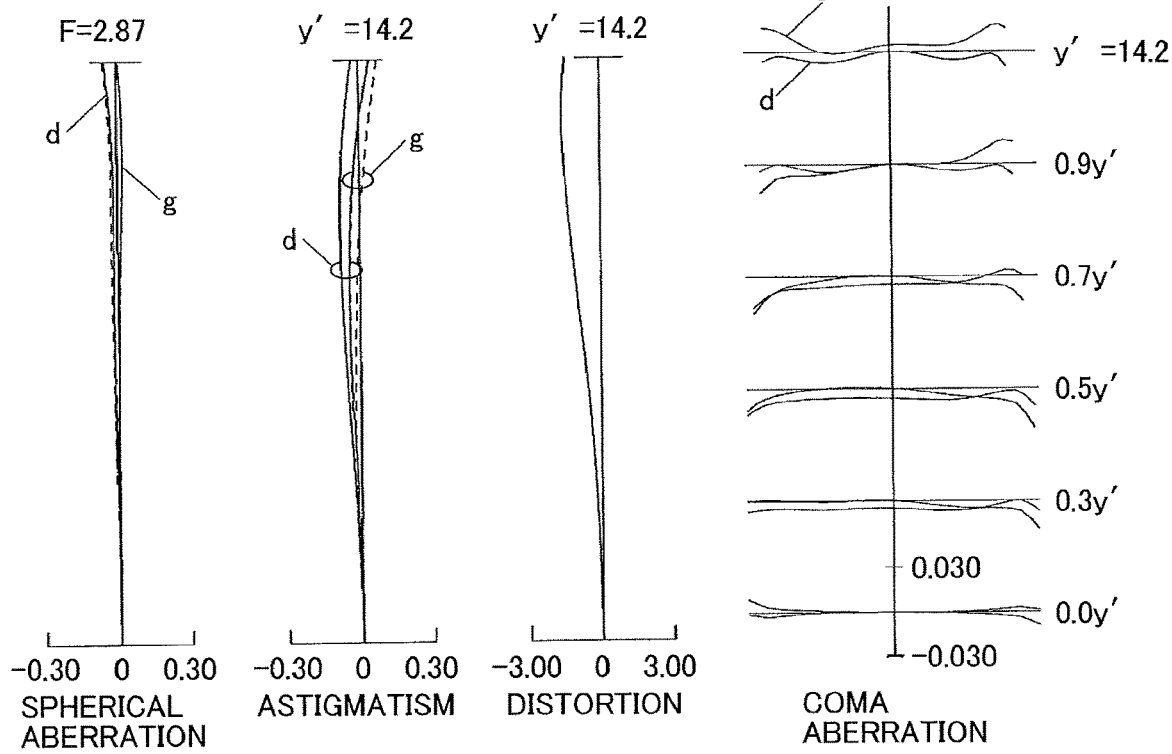
FIG. 13 is an aberration curve diagram of the imaging lens in FIG. 5.
Figure 14:
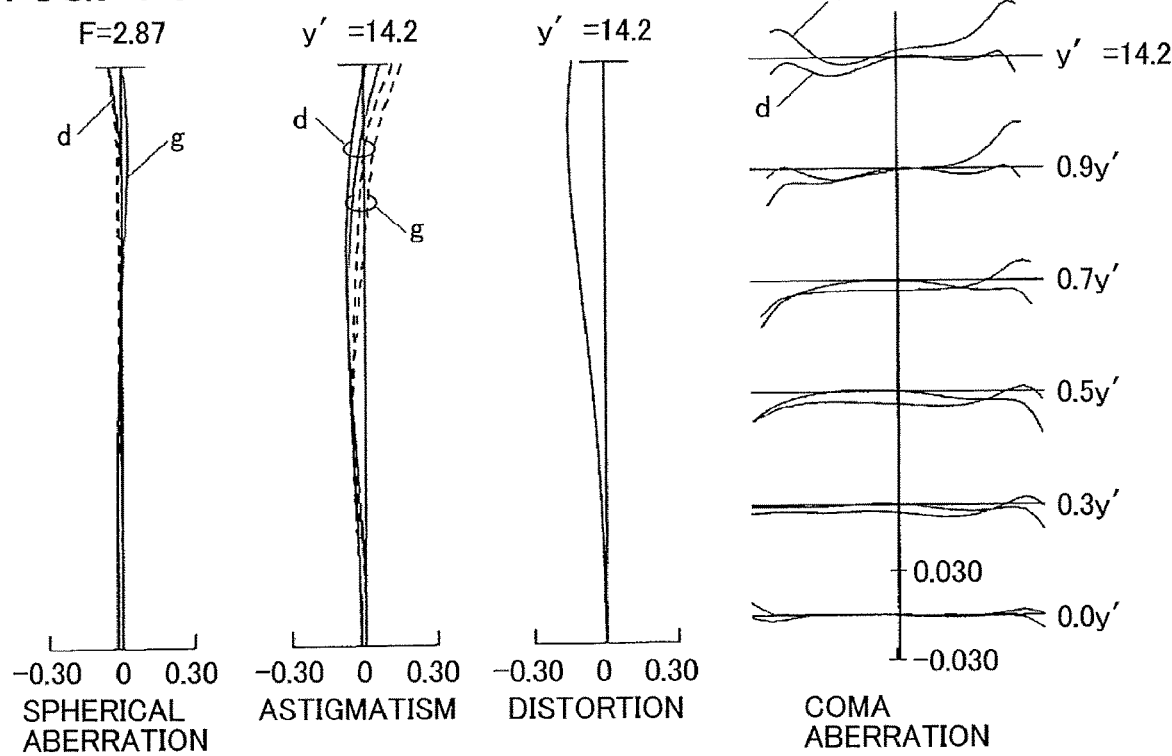
FIG. 14 is an aberration curve diagram of the imaging lens in FIG. 6.

FIG. 9 is an aberration curve diagram of the imaging lens according to Example 1.
FIG. 10 is an aberration curve diagram of the imaging lens according to Example 2.
FIG. 11 is an aberration curve diagram of the imaging lens according to Example 3.
FIG. 12 is an aberration curve diagram of the imaging lens according to Example 4.
FIG. 13 is an aberration curve diagram of the imaging lens according to Example 5.
FIG. 14 is an aberration curve diagram of the imaging lens according to Example 6.
FIG. 15 is an aberration curve diagram of the imaging lens according to Example 7.
FIG. 16 is an aberration curve diagram of the imaging lens according to Example 8.

In the aberration curve diagrams of Examples 1 to 8, broken lines in spherical aberration indicates "sine condition", and solid lines and broken lines in astigmatism indicate "sagittal" and "meridional," respectively.

As illustrated in the aberration curve diagrams, aberrations are corrected at a high level in each of Examples 1 to 8, and particularly spherical aberrations and axial chromatic aberrations are so small. Further, astigmatism, curvature of field, and lateral chromatic aberration are also sufficiently small, and coma aberration and variance in the color difference are well reduced in an area up to the extreme periphery of angle of view. Also, the absolute value of distortion aberration is 2.0% or less.

That is, as indicated by Examples 1 to 8, the imaging lens 31 according to the embodiments of the present disclosure is a wide lens with a half angle of view of approximately 35 to 43 degrees and has a large aperture with an F number of approximately 2.8 to 3.2. Nevertheless, all the total lens length, the total lens thickness, and the lens diameter can be successfully reduced, and favorable imaging performance can be achieved.

By using a high-performance and compact imaging lens, a high-performance portable camera or high-performance portable information terminal device can be provided.

The present disclosure is not limited to the details of the example embodiments described above, and various modifications and improvements are possible.

For example, although a digital camera has been described above as a camera using the imaging lens according to the present disclosure, no limitation is indicated therein. Alternatively, the imaging lens according to at least one embodiment is applicable in a silver salt camera. In addition, the imaging lens according to at least one embodiment of the present disclosure can be used as a photographing lens of a video camera.

The advantageous effects described in the embodiments of the present disclosure are preferred effects provided by disclosure, and the preferred effects are just recited; therefore, advantageous effects of the present disclosure are not limited to the effects described in the embodiments.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodi-

What is claimed is:

1. An imaging lens, comprising:
a front lens group having positive refractive power;
an aperture stop; and
a rear lens group having positive refractive power,
wherein the front lens group, the aperture stop, and the rear lens group are being arranged in that order from an object side to an image side,
wherein an object-side lens closest to an object within the front lens group and an image-side lens closest to an image within the rear lens group are configured so as to form only three air lenses therebetween, each air lens being an air gap between an image-side surface of an object-side lens and an object-side surface of an image-side lens, the object-side lens and the image-side lens being adjacent to each other in an optical axis of the imaging lens, and
wherein the three air lenses include an object-side air lens disposed closest to the object, an image-side air lens disposed closest to the image, and an intermediate air lens disposed between the object-side air lens and the image-side air lens, the object-side air lens and the image-side air lens being biconvex, and the intermediate air lens being biconcave.

2. The imaging lens according to claim 1,
wherein the front lens group includes the object-side air lens,
the rear lens group includes the image-side air lens,
the intermediate air lens is formed between the front lens group and the rear lens group, and
the aperture stop is disposed within the intermediate air lens.

3. The imaging lens according to claim 2, herein the object-side lens closest to the object in the front lens group has negative refractive power.

4. The imaging lens according to claim 3,
wherein the front lens group includes:
a first negative lens disposed closest to the object, the first negative lens having a concave surface facing the image side; and
a second negative lens next to the first negative lens, on the image side relative to the first negative lens, the second negative lens having a concave surface facing the object side,
wherein the object-side air lens is formed between the first negative lens and the second negative lens,
wherein the rear lens group includes:
a meniscus lens disposed closest to the image side, the meniscus lens having a concave surface facing the object side; and
a third negative lens being disposed next to the meniscus lens, on the object side relative to the meniscus lens, the third negative lens having a concave surface facing the object side,
wherein the image-side air lens is formed between the meniscus lens and the third negative lens,
wherein the meniscus lens is one of a single lens and a meniscus cemented lens having a concave surface facing the object side, and
wherein conditional expression [10] below is satisfied:

$$-0.4 < fFF/fRR < 0.6 \quad [10]$$

where fFF denotes a focal length of the first negative lens, and ll denotes a focal length of the meniscus lens.

5. The imaging lens according to claim 1,
wherein the front lens group includes three or four lenses, and
the rear lens group includes three or four lenses.

6. The imaging lens according to claim 1,
wherein conditional expressions [1] and [2] below are satisfied:

$$-0.6 < (r1o+r2o)/(r1o-r2o) < 0.2 \quad [1]$$

$$-0.6 < (r1i+r2i)/(r1i-r2i) < 0.2 \quad [2]$$

where
r1o denotes a radius of curvature of the object-side surface of the object-side air lens,
r2o denotes a radius of curvature of the image-side surface of the object-side air lens,
r1i denotes a radius of curvature of the object-side surface of the image-side air lens, and
r2i denotes a radius of curvature of the image-side surface of the image-side air lens.

7. The imaging lens according to claim 1, wherein conditional expression [3] below is satisfied:

$$0.0 < (r1m+r2m)/(r1m-r2m) < 1.0 \quad [3]$$

where
r1m denotes a radius of curvature of the object-side surface of the intermediate air lens, and
r2m denotes a radius of curvature of the image-side surface of the intermediate air lens.

8. The imaging lens according to claim 1, wherein conditional expression [4] below is satisfied:

$$0.8 < fF/fR < 3.0 \quad [4]$$

where
fF denotes a focal length of the front lens group, and
fR denotes a focal length of the rear lens group.

9. The imaging lens according to claim 1, wherein conditional expressions [5] and [6] below are satisfied:

$$0.7 < Y'/f < 0.95 \quad [5]$$

$$0.6 < \tan(\theta Pmax) < 0.95 \quad [6]$$

where
Y' denotes a maximum image height,
f denotes a focal length of the imaging lens as a whole when the imaging lens is focused on an object at infinity, and
$\theta Pmax$ denotes an angle at which a chief ray reaching the maximum image height hits an image plane.

10. The imaging lens according to claim 1, wherein conditional expression [7] below is satisfied:

$$1.3 < L/f < 1.9 \quad [7]$$

where
L denotes a distance between an image plane and a surface closest to the object in the imaging lens when the imaging lens is focused on an object at infinity, and
f denotes a focal length of the imaging lens as a whole when the imaging lens is focused on the object at infinity.

11. The imaging lens according to claim 1, wherein conditional expression [8] below is satisfied:

$$0.6 < DT/f < 1.1 \quad [8]$$

where
DT denotes a distance between a surface closest to the object and a surface closest to the image, and f denotes a focal length of the imaging lens as a whole when the imaging lens is focused on an object at infinity.

12. The imaging lens according to claim 1, wherein conditional expression [9] below is satisfied:

$$-4.0 < f1/f < -2.2 \qquad [9]$$

where
- f1 denotes a focal length of a lens closest to the object in the front lens group, the lens having negative refractive power, and
- f denotes a focal length of the imaging lens as a whole when the imaging lens is focused on an object at infinity.

13. A camera mounted with the imaging lens according to claim 1 that serves as an imaging optical system.

14. A portable information terminal device comprising a camera device mounted with the imaging lens according to claim 1 that serves an imaging optical system.

15. The imaging lens of claim 1, wherein, for each air lens, the air gap occurs, in a direction of an optical axis of the imaging lens, between at least one point on the image-side surface of the object-side lens and a corresponding point on the object-side surface of the image-side lens.

\* \* \* \* \*